(12) United States Patent
Lundeen et al.

(10) Patent No.: US 12,072,508 B2
(45) Date of Patent: Aug. 27, 2024

(54) SPACE-COMPRESSION MEDIUM WITH TRANSVERSE BEAM DISPLACEMENT REDUCING LIGHT PROPAGATION OR IMAGE FORMATION DISTANCE

(71) Applicant: UNIVERSITY OF OTTAWA, Ottawa (CA)

(72) Inventors: Jeffrey Stephen Lundeen, Ottawa (CA); Robert William Boyd, Ottawa (CA); Orad Reshef, Ottawa (CA); Michael Patrick Delmastro, Ottawa (CA); Ali Hussain H Alhulaymi, Dhahran (SA); Lambert Giner, Ottawa (CA); Katherine Karla Misaye Bearne, Ottawa (CA); Jordan Theodore Roger Pagé, Ottawa (CA)

(73) Assignee: UNIVERSITY OF OTTAWA, Ottawa (CA)

( * ) Notice: Subject to any disclaimer, the term of this patent is extended or adjusted under 35 U.S.C. 154(b) by 604 days.

(21) Appl. No.: 17/165,810

(22) Filed: Feb. 2, 2021

(65) Prior Publication Data
US 2021/0239995 A1 Aug. 5, 2021

Related U.S. Application Data

(60) Provisional application No. 62/969,595, filed on Feb. 3, 2020.

(51) Int. Cl.
*G02B 1/00* (2006.01)
*G02B 5/30* (2006.01)
(Continued)

(52) U.S. Cl.
CPC .......... *G02B 27/1006* (2013.01); *G02B 7/28* (2013.01); *G02B 27/0938* (2013.01);
(Continued)

(58) Field of Classification Search
CPC ...... G02B 27/1006; G02B 7/28; G02B 27/16; G02B 5/3083; G02B 27/12; G02B 1/002;
(Continued)

(56) References Cited

U.S. PATENT DOCUMENTS

| 4,465,621 A * | 8/1984 | Sacher ................. G02B 21/33 |
| | | 252/582 |
| 7,629,941 B2 | 12/2009 | Pendry et al. |
| 9,677,856 B2 | 6/2017 | Pendry et al. |

OTHER PUBLICATIONS

Pacheco-Peña et al., Epsilon-near-zero metalenses operating in the visible Invited paper for the section : Hot topics in Metamaterials and Structures : Elsevier, Optics & Laser Technology 80 (2016), pp. 162-168 (Year: 2016).*

(Continued)

*Primary Examiner* — Ryan S Dunning
(74) *Attorney, Agent, or Firm* — Knobbe, Martens, Olson & Bear, LLP

(57) ABSTRACT

Described are various embodiments of space-compressing methods, materials, devices, and systems, and imaging or optical devices and systems using same. In one embodiment, an optical system comprises an optical convergence element having a defined optical path convergence distance and disposed so to produce converging optical rays along an optical convergence path to converge at said distance; an optical space-compression medium disposed along the optical convergence path to intersect the converging optical rays to compress a resulting optical convergence distance by imparting an inward transverse translation of the converging optical rays while substantially maintaining respective incident convergence angles upon output.

8 Claims, 19 Drawing Sheets

(51) Int. Cl.
| | |
|---|---|
| G02B 7/28 | (2021.01) |
| G02B 27/09 | (2006.01) |
| G02B 27/10 | (2006.01) |
| G02B 27/16 | (2006.01) |

(52) U.S. Cl.
CPC .............. *G02B 27/16* (2013.01); *G02B 1/002* (2013.01); *G02B 5/3083* (2013.01)

(58) Field of Classification Search
CPC .... G02B 1/005; G02B 1/007; G02B 27/0938; G02B 27/0944; G02B 27/095; G02B 27/0955; G02B 27/0972; G02B 2207/117
See application file for complete search history.

(56) References Cited

OTHER PUBLICATIONS

Gao et al. Experimental realization of epsilon-near-zero metamaterial slabs with metal-dielectric multilayers: Appl. Phys. Lett. 103, 051111 (2013) (Year: 2013).*
Moitra et al. Realization of an all-dielectric zero-index optical metamaterial. Nature Photon 7, 791-795 (2013) (Year: 2013).*
Salandrino & Engheta, Far-field subdiffraction optical microscopy using metamaterial crystals: Theory and simulations, Physical Review B 74, 075103 (2006) (Year: 2006).*
Atwater, Bending Light to Our Will ; Materials Research Society Bulletin, vol. 36, Jan. 2011 (Year: 2011).*
Cao et al., Broadband Polarization-Independent Perfect Absorber Using a Phase-Change Metamaterial at Visible Frequencies Sci Rep 4, 3955 (2014) (Year: 2014).*
Yang et al., Optical Properties of Teflon AF Amorphous Fluorpolymers, Journal of Micro/Nanolithography, MEMS, and MOEMS, vol. 7, Issue 3, 033010 (Jul. 2008) (Year: 2008).*
Castaldi, G., Galdi, V., Alu, A., & Engheta, N. (2012). Nonlocal transformation optics. Physical Review Letters 108(6), 063902.
Chen, A., Monticone, F. Dielectric Nonlocal Metasurfaces for Fully Solid-State Ultrathin Optical Systems. ACS Photonics 2021 8 (5), 1439-1447DOI: 10.1021/acsphotonics.1c00189.
Chen, X., Luo, Y., Zhang, J et al. Macroscopic invisibility cloaking of visible light. Nat Commun 2, 176 (2011).
Erdelyi, M. & Gajdatsy, G. Radial and azimuthal polarizer by means of a birefringent plate. J. Opt. A Pure Appl. Opt. 10, 055007 (2008).
Fang, N., et al., Sub-Diffraction-Limited Optical Imaging with a Silver Superlens. Science. Apr. 22, 2005 : 534-537.
Goodman, J. W., Introduction to Fourier Optics, 1996, The McGraw-Hill Companies, Inc. ISBN: 0-07-024254-2.
Guo, C, Wang, H., Fan, S., "Squeeze free space with nonlocal flat optics," Optica 7, 1133-1138 (2020).
Halir, R. et al. Ultra-broadband nanophotonic beamsplitter using an anisotropic sub-wavelength metamaterial (Supporting Information). Laser Photonics Rev. 10, 1039-1046 (2016).
Halir, R. et al. Ultra-broadband nanophotonic beamsplitter using an anisotropic sub-wavelength metamaterial. Laser Photonics Rev. 10, 1039-1046 (2016).
Kwon, H. et al. "Nonlocal metasurfaces for optical signal processing." Physical review letters 121, No. 17 (2018): 173004.
Leonhardt, U., Optical Conformal Mapping. Science. Jun. 23, 2006 : 1777-1780.
Mahmoudi, A., Zero Focal Shift in High Numerical Aperture Focusing of a Gaussian Laser Beam through Multiple Dielectric Interfaces. arXiv: 1409.4021 (2014).
Park, J.H., et al., "Integral imaging with multiple image planes using a uniaxial crystal plate," Opt. Express 11, 1862-1875 (2003).
Pendry, J. B. (2000). "Negative refraction makes a perfect lens". Phys. Rev. Lett. 85 (18): 3966-3969.
Pendry, J.B.; Schurig, D.; Smith, D. R. (2006). "Controlling Electromagnetic Electromagnetic Fields". Science. 312 (5514): 1780-1782.
Pendry, John B., and Smith, David R. "Reversing light with negative refraction." Physics today 57 (2004): 37-43.
Pollard, R.J., Optical Nonlocalities and Additional Waves in Epsilon-Near-Zero Metamaterials. Phys. Rev. Lett. 102, 127405—Published Mar. 27, 2009.
Qian, Q., et al. "All-dielectric polarization-independent optical angular filter." Scientific reports 7, No. 1 (2017): 1-7.
Roberts, D. A., Kundtz, N. & Smith, D. R. Optical lens compression via transformation optics. Opt. Express 17, 16535-16542 (2009).
Saleh, B., Teich, M., Fundamentals of Photonics, 1991 John Wiley & Sons, Inc. ISBN: 0-471-2-1374-8.
Shen, Y., et al. Optical broadband angular selectivity—Supporting Information. Science. Mar. 28, 2014;343(6178): 1499-501. doi: 10.1126/science.1249799. PMID: 24675959.
Shen, Y., et al. Optical broadband angular selectivity. Science. Mar. 28, 2014;343(6178):1499-501. doi: 10.1126/science.1249799. PMID: 24675959.
Yu, N., et al., Light Propagation with Phase Discontinuities: Generalized Laws of Reflection and Refraction. Science. Oct. 21, 2011 : 333-337.
Yu, N.; Capasso, F. "Flat optics with designer metasurfaces". Nat. Mater. 13: 139-150 (2014).
Zhou, J., et al. "Optical edge detection based on high-efficiency dielectric metasurface." Proceedings of the National Academy of Sciences 116, No. 23 (2019): 11137-11140.

* cited by examiner low-index medium uniaxial medium nonlocal metamaterial

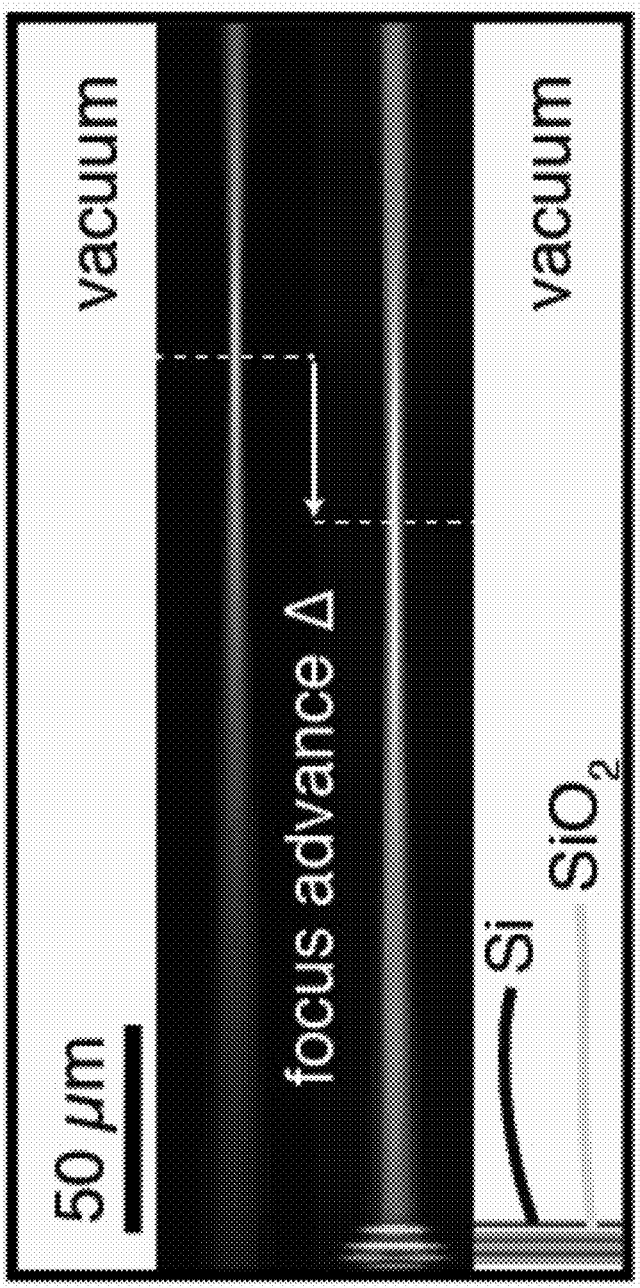
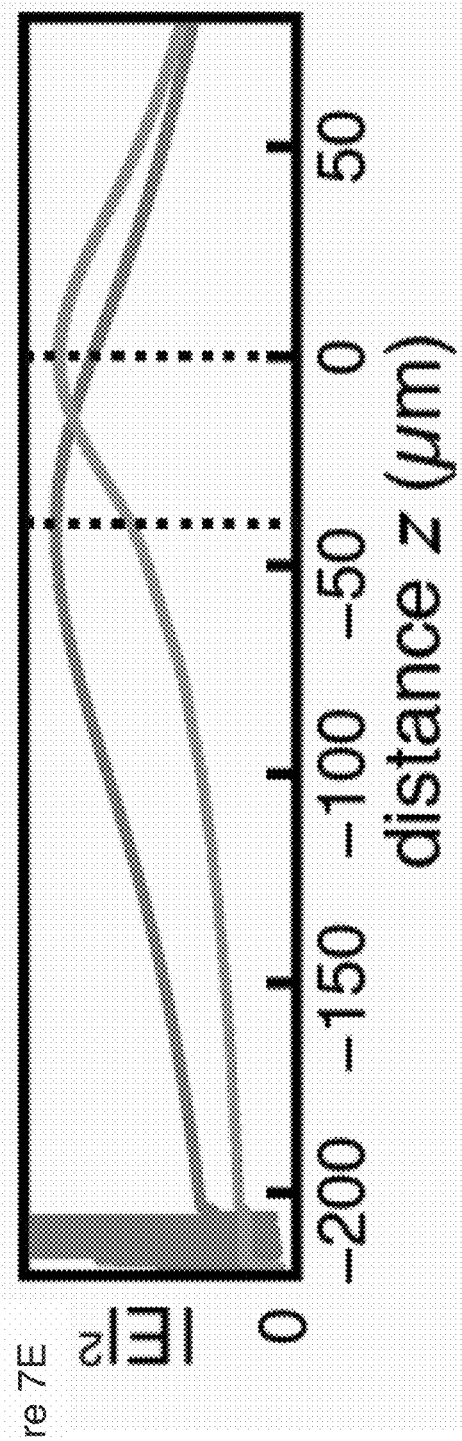
Figure 7A
Figure 7B
Figure 7C
Figure 7D
Figure 7E

Figure 8A
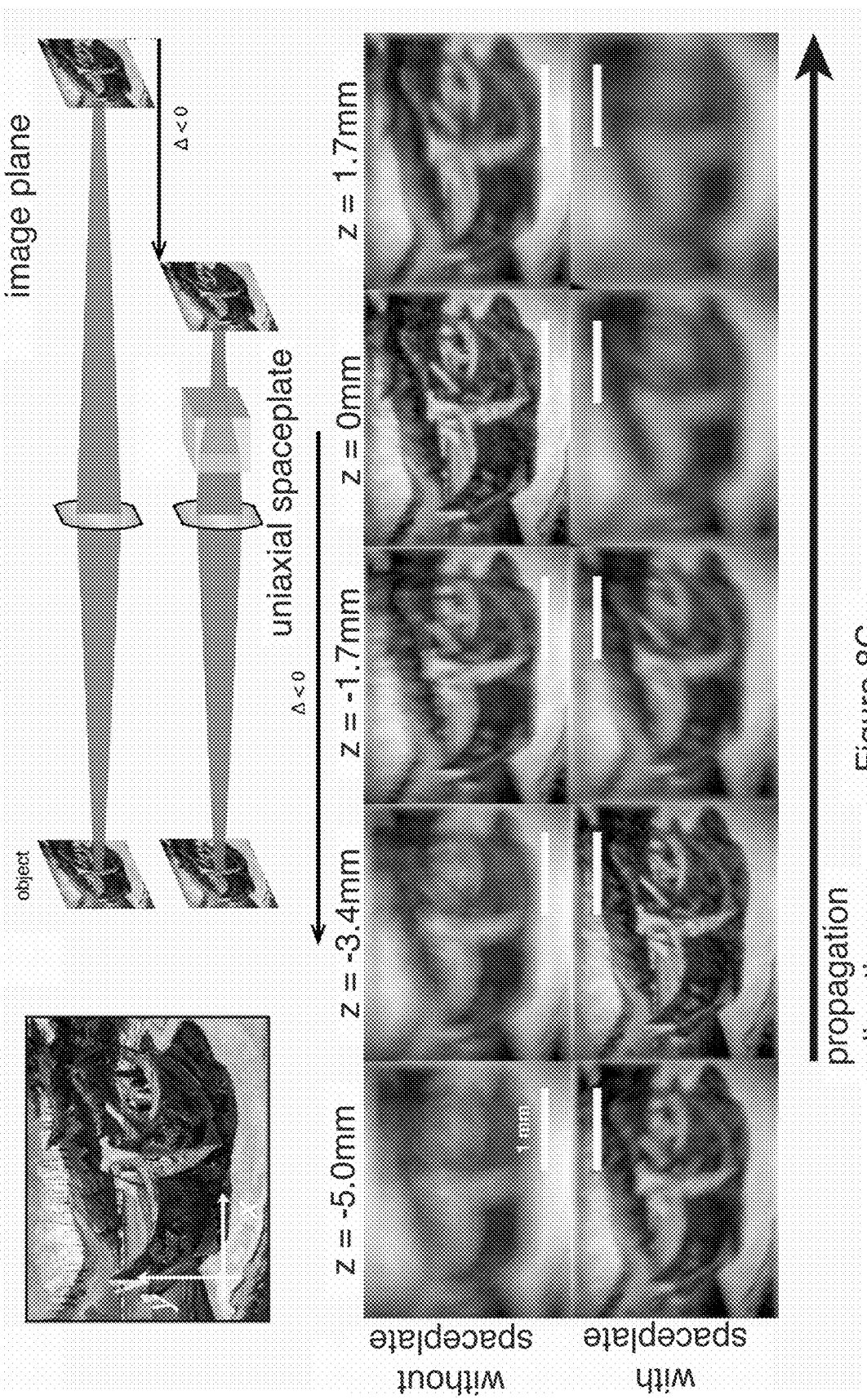
Figure 8B
Figure 8C

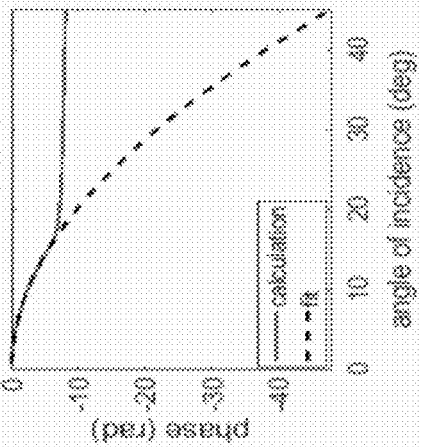
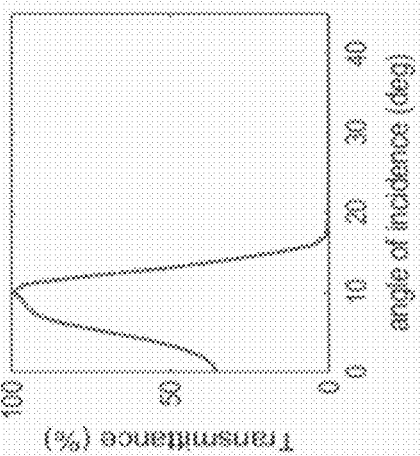
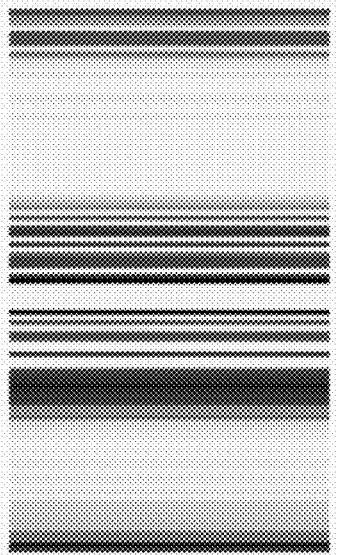
Figure 18A  Figure 18B  Figure 18C
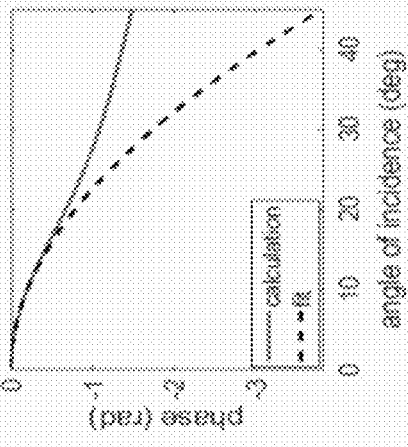
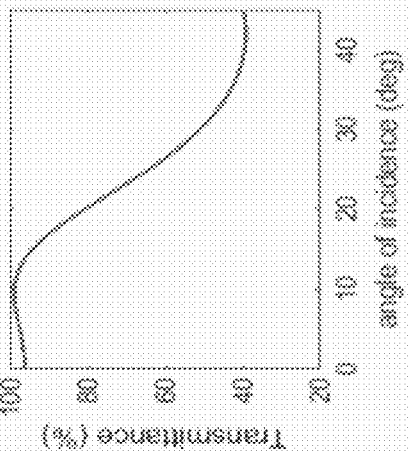
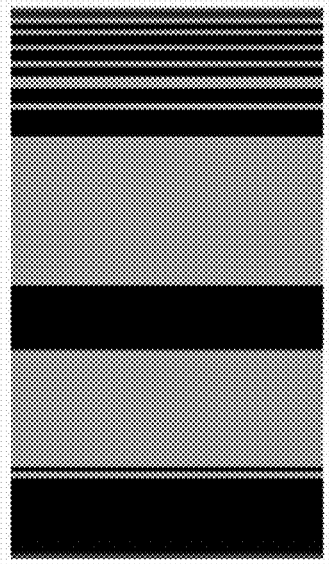
Figure 19A  Figure 19B  Figure 19C

SPACE-COMPRESSION MEDIUM WITH TRANSVERSE BEAM DISPLACEMENT REDUCING LIGHT PROPAGATION OR IMAGE FORMATION DISTANCE

FIELD OF THE DISCLOSURE

The present disclosure relates to optics and imaging systems, and, in particular, to space-compressing methods, materials, devices, and systems, and imaging devices and systems using same.

BACKGROUND

Engineered surfaces consisting of sub-wavelength scatterers, otherwise known as metasurfaces, have attracted a great deal of attention for enabling flat optical components. These devices have been implemented in a diverse set of linear and nonlinear optical applications, including sub-wavelength scale broadband achromatic lenses, the generation of various transverse spatial modes, lasing, polarimetry, and holograms, among others. Notably, metalenses are seen as particularly promising due to their impact in miniaturizing imaging systems. For instance, metamaterials employed in combination with waveguides (MA, C., LIU, Z., "Metamaterial-based optical lenses", U.S. Pat. No. 9,151,891), or those with variable or negative indices (SMITH, R., et al., "Metamaterials", U.S. Pat. No. 8,830,556), have been proposed as optical lens materials. Alternatively, the focal length of an existing lens may be modified by coating one or more surfaces thereof with a metasurface (KAMALI, S. M., et al., "Conformal optical metasurfaces", US 20160320531 A1).

However, in imaging systems, lenses represent just one component; often overlooked is the optical propagation surrounding the lenses and separating them from the object and image. As is clear by the long extent of a classic telescope, the distance between lenses is just as critical to image formation as the lenses themselves, and can easily be greater than the lenses' combined thickness by an order of magnitude. While attachments have been proposed to reduce the focal length of lenses (and thus reduce the post-lens distance required to form an image), for instance via an attachment comprising multiple elements arranged on the image side of an objective lens (CALDWELL, J. B, "Optical attachment for reducing the focal length of an objective lens", U.S. Pat. No. 8,903,232), such systems by definition introduce an additional optical power to the system.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for space-compressing methods, materials, devices, and systems, and imaging devices and systems using same, that overcome some of the drawbacks of known techniques, or at least, provides a useful alternative thereto. Some aspects of this disclosure provide examples of such methods, materials, devices and systems.

In accordance with one aspect, there is provided an optical system comprising: an optical convergence element having a defined optical path convergence distance and disposed so to produce converging optical rays along an optical convergence path to converge at said distance, an optical space-compression medium disposed along said optical convergence path within said distance so to intersect said converging optical rays at respective incident convergence angles to compress a resulting optical convergence distance by imparting an inward transverse translation of said converging optical rays while substantially maintaining said respective incident convergence angles upon output.

In accordance with another aspect, there is provided an optical system wherein said optical space-compression medium comprises an angle-dependent phase response medium that acts on said converging optical rays as a function of said respective incident convergence angles such that said respective angles are maintained upon output while propagating in a manner to converge at a position within said distance.

In accordance with another aspect, there is provided an optical system wherein said optical convergence element comprises a focusing element and wherein said distance comprises a focus distance.

In accordance with another aspect, there is provided an optical system wherein the system comprises an optical imaging system, wherein said focusing element comprises one or more lenses disposed so to produce an image of an object according to said focus distance, and wherein said space-compression medium effectively advances formation of said image within said focus distance.

In accordance with another aspect, there is provided an optical system for reducing a distance over which light propagates through a background medium, comprising: an optical space-compression medium disposed so to intersect a light field incident thereon having an incident angular distribution, said optical space-compression medium comprising an angle-dependent phase response that propagates a phase of said light field while travelling therethrough by an amount that is greater than a corresponding propagation of said phase in a region of the background medium of equal size to that of said optical-space compression medium, while maintaining said incident angular distribution upon said light field exiting said optical space-compression medium.

In accordance with another aspect, there is provided an optical system further comprising a light-shaping element disposed upstream of said optical space-compression medium so to produce said incident angular distribution.

In accordance with another aspect, there is provided an optical system wherein said optical space-compression medium effectively increases a transverse displacement of a beam of said light field relative to a corresponding transverse translation of said beam through a region of the background medium of an equal size to that of said optical space-compression medium.

In accordance with another aspect, there is provided an optical system wherein said phase response is at least partially governed by an angle-dependent refractive index defined by:

$$\frac{n(\theta_{SP})}{n_{BG}} = \frac{C + \sqrt{C^2 + (\mathcal{R}^2 - C^2)(1 + (\mathcal{R}^2\tan^2\theta_{SP})}}{(1 + \mathcal{R}^2\tan^2\theta_{SP})\cos\theta_{SP}},$$

In accordance with another aspect, there is provided an optical system wherein an index of refraction of said space-compression medium is lower than an index of refraction of a surrounding environment in which said converging optical rays propagate.

In accordance with another aspect, there is provided an optical system wherein said index of refraction of said medium is less than 1.

In accordance with another aspect, there is provided an optical system wherein said index of refraction of said surrounding environment is greater than 1.

In accordance with another aspect, there is provided an optical system wherein said surrounding environment comprises an oil.

In accordance with another aspect, there is provided an optical system wherein said medium comprises a negative uniaxial birefringent material.

In accordance with another aspect, there is provided an optical system wherein said negative uniaxial birefringent material comprises calcite.

In accordance with another aspect, there is provided an optical system wherein said medium comprises a biaxial crystal.

In accordance with another aspect, there is provided an optical system wherein said negative uniaxial birefringent medium comprises alternating layers of two or more materials.

In accordance with another aspect, there is provided an optical system wherein at least one of said alternating layers has a thickness less than a wavelength of light propagating therethrough.

In accordance with another aspect, there is provided an optical system wherein said medium comprises a metamaterial.

In accordance with another aspect, there is provided an optical system wherein said metamaterial is a non-local metamaterial.

In accordance with another aspect, there is provided an optical system wherein said metamaterial comprises two or more layers of alternating materials.

In accordance with another aspect, there is provided an optical system wherein said alternating materials comprise a silicon and a silicon oxide.

In accordance with another aspect, there is provided an optical system wherein said silicon oxide comprises silicon dioxide.

In one embodiment, at least two of the two or more layers have different respective indices of refraction.

In one embodiment, at least two of the two or more layers have different respective thicknesses.

In one embodiment, the two or more layers comprises an odd number of layers.

In one embodiment, a first layer and a final layer of said two or more layers of alternating materials comprise a common material.

In accordance with another aspect, there is provided an optical system wherein said medium comprises a dynamic birefringent material.

In accordance with another aspect, there is provided an optical system wherein said dynamic birefringent material comprises a liquid crystal.

In accordance with another aspect, there is provided an optical system wherein said medium comprises a combination of any one or more of a medium with an index of refraction lower than a surrounding index of refraction, a negative birefringent material, a negative uniaxial birefringent material, a dynamic birefringent material, a metamaterial, or a liquid crystal.

In accordance with another aspect, there is provided an optical system wherein said medium comprises a nanostructured material.

In accordance with another aspect, there is provided an optical system wherein the system is operable with visible light.

In accordance with another aspect, there is provided an optical system wherein the system comprises a camera, a microscope, or a telescope.

In accordance with another aspect, there is provided an optical system wherein the system is a monolithic camera.

In accordance with another aspect, there is provided an optical system wherein the system in a solar energy system.

In one embodiment, the medium is polarisation-independent.

In accordance with another aspect, there is provided an optical imaging system for capturing an image of an object, the device comprising: an optical component disposable so to intersect and thus angularly distribute light from the object to form an image thereof at an image formation path distance from said optical component, wherein said angular distribution and said image formation path distance are designated, at least in part, by an optical property of said image formation optics, a space-compression medium disposed within said distance so to intersect said angularly distributed light such that an incident angular distribution thereof is maintained at output while effectively reducing said distance to ultimately form the image at a device image location advanced from said image formation path distance, and an image capture device disposed at said device image location.

In accordance with another aspect, there is provided an optical imaging system wherein said space-compression medium is disposed such that an internal angular distribution corresponding to said incident angular distribution is increased relative to normal while within said medium so to effectively advance production of the image.

In accordance with another aspect, there is provided an optical imaging system wherein said optical component comprises a converging optical component producing a converging angular light distribution, and wherein said space-compression medium is disposed so to intersect said converging angular light distribution.

In accordance with another aspect, there is provided an optical imaging system wherein said optical component comprises a diverging optical component producing a diverging angular light distribution, and wherein said space-compression medium is disposed so to intersect said diverging angular light distribution.

In accordance with another aspect, there is provided an optical imaging system wherein said optical component comprises an upstream optical component, the system further comprises a complementary optical component disposable so to intersect light from the upstream optical component at a designated intervening distance therefrom so to form the image at said image formation distance, wherein said designated intervening distance is designated, at least in part, by said optical property of said upstream optical component, said space-compression medium is disposed within said designated intervening distance so to intersect said angularly distributed light such that said incident angular distribution thereof is maintained at output while effectively reducing said designated intervening distance to an advanced intervening distance lesser than said designated intervening distance, and said complementary optical component is disposed at said advanced intervening distance downstream said space-compression medium to form the image at said device image location.

In accordance with another aspect, there is provided an optical imaging system wherein said medium comprises an angle-dependent phase response medium disposed so to intersect said angularly distributed light and apply a phase response thereto as a function of said incident angular distribution so to effectively advance formation of the image.

In accordance with another aspect, there is provided an optical imaging system wherein said phase response comprises a non-linear phase response.

In accordance with another aspect, there is provided an optical imaging system wherein said phase response is at least partially governed by an angle-dependent refractive index defined by:

$$\frac{n(\theta_{SP})}{n_{BG}} = \frac{C + \sqrt{C^2 + (\mathcal{R}^2 - C^2)(1 + (\mathcal{R}^2\tan^2\theta_{SP})}}{(1 + \mathcal{R}^2\tan^2\theta_{SP})\cos\theta_{SP}},$$

where $C=(\phi_G+2\pi m(\theta_{SP}))/\phi_{BG}(0,d)$.

In accordance with another aspect, there is provided an optical imaging system wherein said space-compression medium is juxtaposed between said image formation optics and said image capture device.

In accordance with another aspect, there is provided a system to interface with input light, the system comprising a light-interfacing component having a designated effective light-interfacing area, a light shaping element disposed at a component distance along a corresponding light path upstream from said light-interfacing component so to intersect the input light, and selected to angularly distribute the input light to produce angularly-distributed light that will substantially satisfy said designated effective light-interfacing area at a designated light path distance from said light shaping element given an inherent characteristic of said light shaping element, wherein said designated light path distance is beyond said component distance, and a space-compression medium disposed between said light-interfacing component and said light shaping element so to intersect said angularly distributed light such that an incident angular distribution thereof is maintained at output while effectively reducing said designated light path distance by ultimately producing said angularly-distributed light substantially satisfying said designated light-interfacing area, in concert with said light shaping element, at said component light path distance.

In accordance with another aspect, there is provided a system wherein said light-interfacing component comprises an optical sensor having a designated effective light sensing area.

In accordance with another aspect, there is provided a system wherein said light-interfacing component comprises a complementary light-shaping element having a designated optimal incident light-interfacing area.

In accordance with another aspect, there is provided a system wherein said light shaping element comprises at least one of a lens, a reflector, a mirror or a prism.

In accordance with another aspect, there is provided a system wherein said medium comprises an angle-dependent phase response medium disposed so to intersect said angularly distributed light and apply a phase response thereto as a function of said incident angular distribution so to effectively reduce said designated distance.

In accordance with another aspect, there is provided a system wherein said phase response is at least partially governed by an angle-dependent refractive index defined by:

$$\frac{n(\theta_{SP})}{n_{BG}} = \frac{C + \sqrt{C^2 + (\mathcal{R}^2 - C^2)(1 + (\mathcal{R}^2\tan^2\theta_{SP})}}{(1 + \mathcal{R}^2\tan^2\theta_{SP})\cos\theta_{SP}},$$

where $C=(\phi_G+2\pi m(\theta_{SP}))/\phi_{BG}(0,d)$.

In accordance with another aspect, there is provided a system wherein the phase response produces an output phase $\Phi$ of light output from said space compression medium at least partially in accordance with $\Phi=2\pi n_{BG} d_{eff} \cos\theta/\lambda$.

In accordance with another aspect, there is provided a system wherein substantially maintaining the incident angular distribution comprises substantially maintaining the incident angular distribution while including an arbitrary offset angle therewith upon the light field exiting the optical space-compression medium.

In accordance with another aspect, there is provided a system wherein substantially maintaining the incident angular distribution comprises maintaining the incident angular distribution within a designated error tolerance upon the light field exiting the optical space-compression medium.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIGS. 3A to 3C are schematic diagrams of beam focusing geometries in open space, via a standard optical medium, and via a spaceplate medium, respectively, whereas

FIGS. 7A to 7E are plots demonstrating a performance of a multilayer spaceplate, in accordance with at least one of the various embodiments;

FIGS. 8A and 8B are schematic diagrams representing spaceplate functionality for producing a colour image, and FIG. 8C are images of a print formed at various distances with and without a spaceplate, in accordance with various embodiments;

FIG. 18A is a schematic of an exemplary spaceplate with layers having variable indices of refraction and a total width of 0.51 μm, FIG. 18B is an exemplary plot of the transmittance of the spaceplate in FIG. 18A as a function of the angle of incidence of light, and FIG. 18C is an exemplary plot showing a fit of the phase output of the exemplary spaceplate of FIG. 18A to the output of an ideal spaceplate having a similar compression ratio, in accordance with some embodiments;

FIG. 19A is a schematic of an exemplary spaceplate with layers having variable indices of refraction between 1 and 4 and a total width of 0.51 μm, FIG. 19B is an exemplary plot of the transmittance of the spaceplate in FIG. 19A as a function of the angle of incidence of light, and FIG. 19C is an exemplary plot showing a fit of the phase output of the exemplary spaceplate of FIG. 19A to the output of an ideal spaceplate having a similar compression ratio, in accordance with some embodiments.

Figure 1:
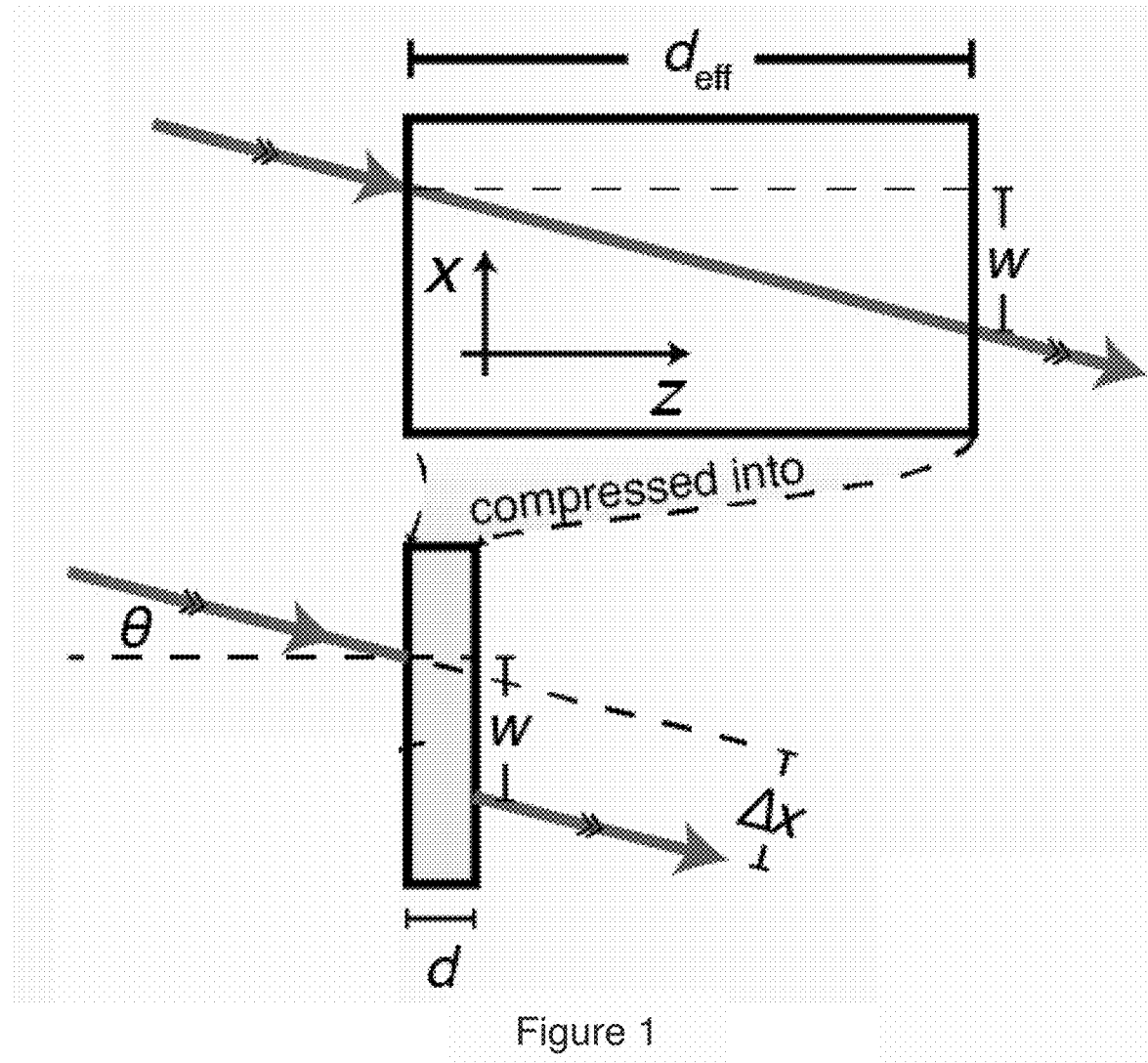
FIG. 1 is a schematic of an operating principle of a space-compressing material or medium for an imaging system, otherwise interchangeably referred to herein as a spaceplate, in accordance with at least one of the various embodiments.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . ." and "one or more . . ." language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The terms "spaceplate" or "space-compressing" imaging material or medium, as interchangeably used herein, will be understood to mean a medium through which light may travel and experience, in some embodiments, an angle-dependent phase response (ADPR), or an ADPR medium. Generally, a spaceplate may influence a light field by reducing the size of a region of space in which light typically propagates. It may, in some embodiments, mimic the effects a space, or distance, over which light may propagate that is larger than a dimension of the spaceplate itself, effectively "compressing" space. In various embodiments, light traveling through a spaceplate thickness d may experience a phase shift as if it had propagated a greater effective distance $d_{eff}$ through another medium. In various embodiments, this may result in a shortening, reduction or compression of a distance otherwise required to focus an image, for example, in an (optical) imaging system or device, and thus, result in a space-compressing solution for such systems or devices. Without departing from the scope of the disclosure, such media may include, but are not limited to, a nanostructured material, a multilayered material, a multilayered material comprising at least one sub-wavelength-thick layer, a material having a lower index of refraction than a surrounding medium, a metamaterial, or a material in which light experiences a non-local response and/or a non-local phase response. An ADPR medium may comprise one or more layers, wherein each of the one or more layers of the medium may comprise one or more atomic species, molecules, atomic structures and/or chemical species, and adjacent layers may comprise the same or different atomic species, molecules, atomic structures and/or chemical species. In accordance with various aspects, a spaceplate may be any one or more known or as yet unknown state of matter, including, but not limited to, a solid, liquid, gas, plasma, liquid crystal, or the like.

In accordance with various embodiments, an ADPR medium may optionally comprise materials that provide a contrast in index of refraction with respect to that of a surrounding medium, although such a property is not required to enable an angle-dependent phase response within the scope of this disclosure. Such media may also be transparent to a particular wavelength or spectrum of light, and may additionally or alternatively have an index (or indices) of refraction that is (are) invariant as a function of wavelength, or invariant within a range of wavelengths.

In accordance with various embodiments, the term "light" may refer to any wavelength or one or more spectra of wavelengths of electromagnetic radiation. While various examples as described herein may refer to "optical" light, or suggest "visible" light, such description is not intended to limit the scope of the disclosure, and may refer to any known wavelength(s) of light, including, but not limited to, cosmic rays, gamma rays, x-rays, ultraviolet (UV) rays, visible light, infrared (IR), microwaves, radar, radio, broadcast band, or the like, or combination thereof. Accordingly, reference to imaging devices or systems will be understood to include different imaging systems in which electromagnetic waves representative of an imaged object are manipulated and converged to form an image of that object. Furthermore, the term "light" may additionally or alternatively comprise a "light field", which may comprise a vector function that describes the amount of light flowing in any and/or every direction in every point in a region of space.

It will be appreciated that while imaging devices and optical systems are described herein for illustrative purposes, different optical systems and devices may be considered herein in which a particular or overall optical spacing can be reduced by the introduction of a space-compression medium or spaceplate as described herein. For instance, different embodiments may involve the manipulation of angularly distributed light, such as, but not limited to, light geometrically defined by one or more converging or diverging beams, in which an optical path of such beams can be substantially reduced in length via the introduction of a spaceplate as defined herein that maintains an incident angular distribution at its output while compressing an effective optical path of the system of the whole. For instance, a spaceplate may reduce an optical path required to achieve a particular optical beam convergence or divergence (e.g. optimal beam size or cross section, and angular profile, at a particular light path location), such as to ultimately (optimally) interface with a designated light-interfacing component (having a designated effective or optical light-interfacing area) such as a sensor, complementary light-shaping component (e.g. lens, mirror, prism, etc.) or the like, while maintaining the intended angular distribution of the light field at that particular point in the optical path. As such, a spaceplate may be effectively disposed downstream of different beam/light field shaping components having designated optical properties to produce a particular angular light distribution, so to maintain that angular distribution while reducing a required optical path length otherwise required to propagate the light to its next downstream component (e.g. sensor, mirror, lens, prism, etc.). As will be readily appreciated by the skilled artisan, one or more spaceplates as described herein may thus be interposed within simple or complex optical arrangements so to cumulatively reduce an overall optical path length required to achieve an otherwise lengthier optical path devoid of such spaceplate(s).

Various aspects of the disclosure relate to an imaging system. Examples of such a system may include, but are not limited to, cameras, microscopes, telescopes, optical circuits, integrated optics systems, spectrometers, solar panels, solar energy systems, light sensors, recording devices, devices which manipulate the path of light, such as invisibility cloaks or stealth-related systems, or the like.

In accordance with various embodiments, a spaceplate may influence the phase properties, path, trajectory, convergence point, or focus point, of light which is either converging or diverging. Such converging or diverging may be due to the presence of a focusing element, interchangeably referred to herein as a "lens", which resides at least in part in the path of the light, wherein a focusing element or lens may be any one or more of, but is not limited to, a lens, a lens system, a metalens, a refracting element, a focusing element, a material which provides an optical power, a material which changes the angle of a ray of light, or the like. As such, a "post-lens propagation length" or "post-lens propagation distance" may refer to, in accordance with various embodiments, the distance or space required after a focusing element (with respect to the direction of light travel) required to focus light to a designated focus quality. In accordance with various aspects, focus quality may refer to a desired level of convergence (or divergence), and need not be a maximal (or minimal) level of convergence or divergence. For example, a spaceplate may be placed between two or more lenses within a light path, wherein the light reaches an optimal focus within a region outside of the lens-spaceplate-lens system.

More generally, a spaceplate may additionally or alternatively be applied to miniaturize devices that implicitly manipulate the spatial profile of light, non-limiting examples of which may include solar concentrators, collimation of light sources, integrated optical components, or spectrometers. While some examples herein described refer to optical systems in which light is converging, such examples are not intended to limit the scope of the disclosure. Non-limiting examples of where the methods and systems herein taught may apply for effectively compressing a region of space through which diverging is light propagating may include, in accordance with various embodiments, the collimation of laser sources, spatial filters, beam expanders or shrinkers, beam shapers, and the like.

Centuries of effort to improve imaging has focused on perfecting and combining lenses to obtain better optical performance, such as achromatic lenses, and new functionalities, such as microscopy. The arrival of nanotechnology has enabled thin subwavelength-structured surfaces, typically referred to as metalenses, which promise to make imaging devices more compact. However, unaddressed by this promise is minimization of the space between the lenses, which is crucial for image formation but takes up by far the most space in imaging systems. Various aspects of the disclosure address this issue via an optical spaceplate, a medium that effectively propagates light for a length that can be considerably longer than the thickness of the medium itself. Such propagation compression may, in accordance with various embodiments, produce various optical effects. For example, and without limitation, a spaceplate may focus a beam of light, produce a transverse translation of a beam of light incident at an angle, or form an image.

While metalenses and most other optical components act on the complex light field at each transverse position (i.e. locally), a spaceplate as described herein operates directly on the transverse momentum of the field (i.e., non-locally). In accordance with various aspects, a spaceplate may reproduce a Fourier transfer function that describes the propagation of light through a medium (e.g. a homogeneous isotropic dielectric slab, such as a slab of vacuum) by shifting the phase as a function of the light's (or wave's) direction. As a result, a spaceplate, in accordance with various aspects of the disclosure, may compress the length of an imaging system. Such aspects may, for instance, enable or facilitate the generation of ultra-thin optical systems, such as monolithic cameras, in accordance with various embodiments. A spaceplate may also, in various other embodiments, be of use in telephoto lens systems, which typically comprise at least a focal length of distance a lens and imaging sensor and/or element. It may also contribute to casing constraints related to image sensor size and field of view (i.e. pixel size and image resolution) as related to optical systems. Various impacts of the disclosure may thus enable ultra-large pixels in imaging systems for improved sensitivity, for example.

Other optical components such as metasurfaces, or engineered surfaces consisting of sub-wavelength scatterers, have attracted a great deal of attention for enabling flat optical components. Such devices have been implemented in a diverse set of novel linear and nonlinear optical applications, including sub-wavelength-scale broadband achromatic lenses, the generation of various transverse spatial modes, lasing, polarimetry, holograms, and the like. Notably, metalenses have been considered as a promising optical element due to their impact in miniaturizing imaging systems. However, in all imaging systems, lenses represent just one of the primary components; the other, often overlooked, is the relatively long (often millimeter-to-meter-scale) optical propagation surrounding lenses and separating them from an object and/or image. As evidenced by the long length of a typical telescope, the distance between lenses, objects, and/or images is comparably critical to image formation as the lenses themselves, and can easily be greater than the lenses' combined thickness by one or more orders of magnitude. To date, no metasurface or metamaterial has been proposed to address this dominant contribution to the overall size of an optical system.

Throughout the following description, reference may be made to an x-y-z coordinate system for clarity, where x and y are the transverse directions and z is the optical system axis (e.g. a beam axis). For example, and in accordance with some embodiments, an optical system may comprise a crystal. In such examples, a crystal's height dimension is along y in this coordinate system. The extraordinary optical axis of a tilted crystal defines z' of a second coordinate system, x'-y'-z'. Thus, the second coordinate system is related to the first by a rotation about y by angle α. In accordance with various embodiments, a uniaxial spaceplate may act to provide an effective distance or length $d_{eff}=Rd$ along z' with a compression factor $R=n_o/n_e$, where $n_o$ and $n_e$ are, respectively, indices of refraction for ordinary (o) and extraordinary (e) polarizations. This tilt may reduce the effective distance along z by a factor cos α, which for small α is approximately unity. This effect is included in predicted values for the focal shifts Δ.

The systems and methods described herein provide, in accordance with different embodiments, different examples in which the size or distances between optical elements in an imaging system can be reduced or compressed using an optical element or medium referred to herein as a spaceplate. The functionality of a spaceplate, in accordance with various embodiments, is highlighted in FIG. 1. This spaceplate may occupy a physical thickness of d while propagating light for an effective length of $d_{eff}$ which is greater than d, where the ratio between these two quantities $R=d_{eff}/d$ is a compression factor of the spaceplate. In particular, a spaceplate may produce the same transverse displacement of a beam parallel to a surface (labeled as w in FIG. 1) as that of a longer propagation length $d_{eff}$, without impacting a propagation angle of this beam, i.e. without impacting a convergence (or divergence) angle of an input beam and thus without impacting an optical power of the optical arrangement in general, and/or without affecting the angular distribution of a light field that is used for, for instance, imaging.

Stated differently, in accordance with various embodiments, a spaceplate may compress a propagation length of $d_{eff}$ into a thickness d. For example, with reference to FIG. 1, a beam incident on the spaceplate at angle θ may emerge at that same angle and be transversely translated by length w (resulting in a lateral beam shift Δx), just as it would for $d_{eff}$ of free space. As such, a spaceplate "mimics" more space than it occupies, or replaces a region of space that is larger than the spaceplate itself. In various embodiments, a spaceplate may phase-shift plane waves as would free space of a greater length than the thickness of the spaceplate.

The operation of a spaceplate, in accordance with various embodiments, may be related to the principle that upon transmission, a spaceplate preserves propagation angle q. That is, light rays exiting the plate are parallel to their corresponding incoming rays. This criterion may ensure that the plate will not introduce any additional lens or optical power (i.e., magnification) to an image. At least for these reasons, a spaceplate is a fundamentally new type of optical element that is inherently different than, for example, curved mirrors, filters, or lenses.

Figure 2A:
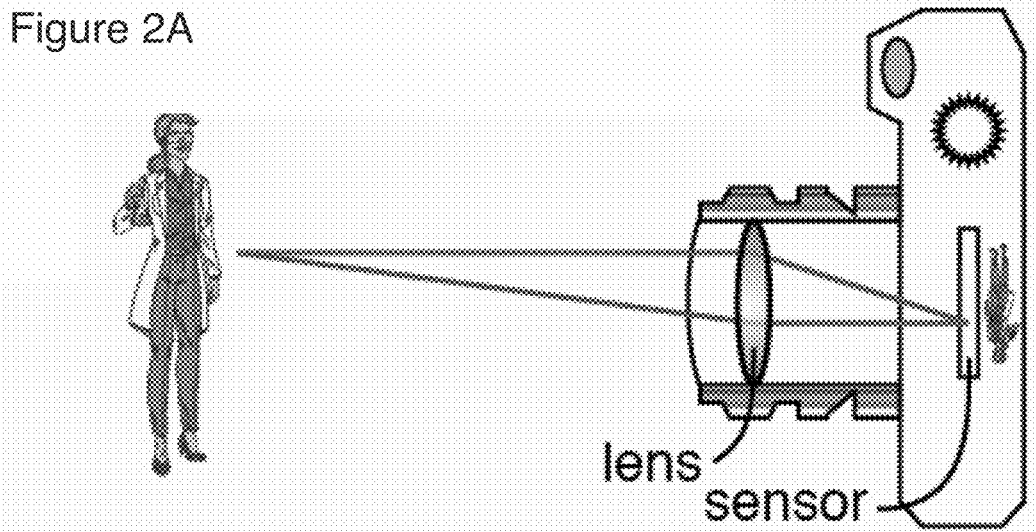
FIGS. 2A to 2C are schematic diagrams of an imaging device, such as a camera, and different spaceplate implementations therein, in accordance with different embodiments.
Figure 2B:
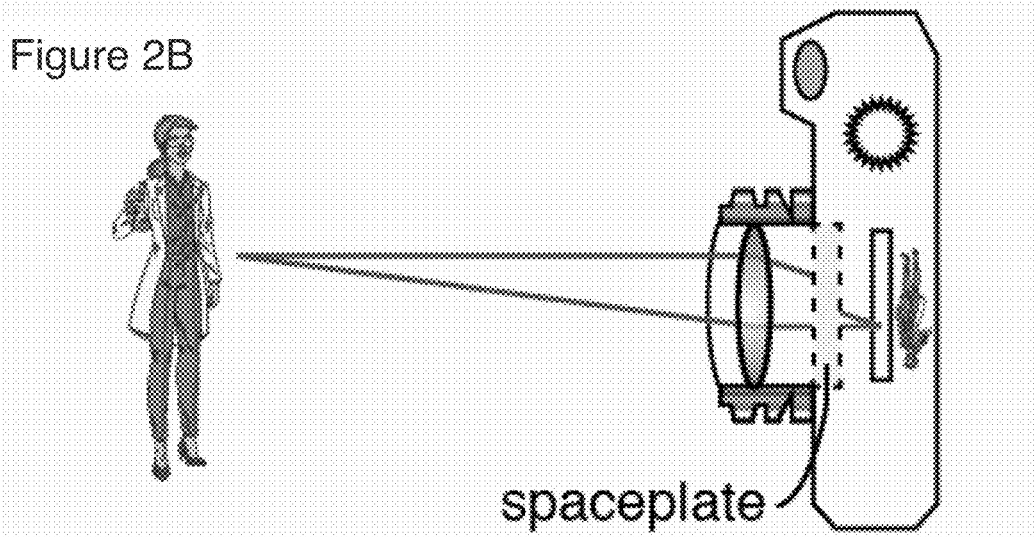
Figure 2C:
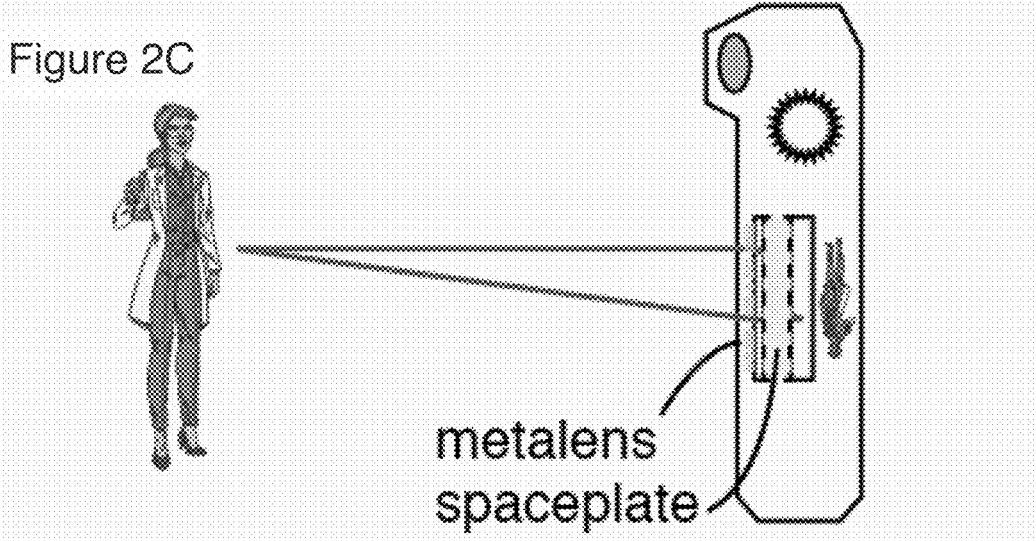

The application of a spaceplate to miniaturizing a camera, in accordance with various embodiments, is illustrated in FIGS. 2A to 2C. Similar considerations and configurations may be equally applied to other imaging devices. The space between a lens and a sensor of a camera is dictated to a large degree by the focal length f of the lens. In typical systems, a relatively large focal length is necessary to suitably magnify an image, which may lead to long lens barrels in, for instance, cameras. Integrating a spaceplate into a camera may allow for the magnification of a faraway object without the need for a proportional propagation length. As such, a spaceplate may thereby improve or eliminate the trade-off between lens barrel length and image magnification in conventional systems. For instance, in conventional systems, a lens barrel length is effectively locked to a maximum image magnification. A spaceplate may "unlock" this constraint. As a resulting image may now be relatively large(r), so may be the image sensor (e.g. a charge-coupled device, or CCD, array). As such, one may capitalize on this larger sensor by using larger pixels for, for instance, low-light sensitivity, or a greater number of pixels for a higher resolution. As such, a spaceplate, in accordance with various embodiments, may also improve the trade-off between camera miniaturisation and resolution or sensitivity.

With continued reference to FIGS. 2A to 2C, introduction of a spaceplate in an imaging system such as a standard camera (FIG. 2A) will shorten or compress the inter-optical spacing of the camera (FIG. 2B). An ultrathin monolithic imaging system may be formed by, for instance, further integrating a metalens and a spaceplate directly on a sensor (FIG. 2C), in accordance with various embodiments.

Accordingly, both a spaceplate and a metalens may, in accordance with various embodiments, be integrated directly on top of a sensor to enable an ultra-thin monolithic camera or like imaging device. Other optical devices that implicitly use imaging, a non-limiting example of which may be a grating spectrometer which employs a slit, or systems that manipulate light via its propagation, such as a solar concentrator, multiplane mode demultiplexer, or a multi-mode interferometer in integrated optics, may be similarly advantaged by such a system.

Understanding of various aspects of the disclosure may be facilitated by considering the perspective of Fourier optics with respect to what space does to each plane-wave that composes an incident field (i.e. to any given spatial Fourier component at momentum vector k). The amplitude of each k-vector component is preserved in its free-space propagation, whereas the phase is shifted. Consider two points along z separated by $d_{eff}$ in a given plane-wave. The wave's phase difference between these points will be $\Phi = k_z d_{eff}$, where $k_z = |k| \cos \theta$, and $\theta$ is the angle of k to the z-axis. Combining this amplitude and phase behaviour, the Fourier transfer function of free space is $H(k) = \exp(i k_z d_{eff})$. Therefore, a spaceplate, in accordance with various embodiments, may produce the same transfer function.

Various aspects relate to spaceplate designs that may be translationally invariant along the transverse directions x and y. This invariance may ensure that a transmitted wave will have the same k-vector as a respective incident wave, which may be a necessity for $|H|=1$. Returning to phase, with $|k|=(2\pi n_{BG}/\lambda)$ we find $\Phi = (2\pi n_{BG} d_{eff} \cos \theta / \lambda) = \Phi_{BG}$, where $\lambda$ is the wavelength of light in vacuum and $n_{BG}$ is the index of the medium in the $d_{eff}$ slab of space.

In accordance with various aspects, a desired characteristic of a spaceplate may be to produce an angle-dependent phase profile $\Phi_{SP}$ that is equal to $\Phi_{BG}(\theta, d_{eff})$, but within a distance shorter than $d_{eff}$ (i.e. in a plate thickness d). Two parameters in the angular phase profile $\Phi_{SP}$ that do not affect the imaging properties of the plate may be: the addition of an arbitrary global phase offset $\Phi_G$ to $\Phi_{SP}$ (i.e. independent of $\theta$), or $\Phi_{SP}$ may be discontinuous as a function of $\theta$, with discontinuities of an integer multiple m of $2\pi$. The latter solution may, in accordance with various embodiments, correspond to the Fourier-space analogue of a Fresnel lens. These two free parameters hint at the substantial flexibility available to design a spaceplate, some non-limiting examples of which will be described below with reference to operating mechanisms which may impart such an angular-dependent phase.

In accordance with various embodiments, a spaceplate comprises a plate or multilayer stack that conserves momentum along its interface (i.e. the accumulated phase of light in x through the spaceplate is equal to what it would be for light travelling the same distance through free space). Additionally, or alternatively, a spaceplate may be a medium through which phase accumulation in the z direction is equal to a phase accumulation that corresponds to a longer distance of free space than is the thickness of the spaceplate. In accordance with various embodiments, the phase shift experienced by light propagating through a spaceplate of thickness d is the phase shift that would arise from light propagating through $d_{eff}$ of free space, where $d < d_{eff}$. The phase shift due to spaceplate may be given by $\Phi_z(k_z) = k_z d_{eff} = ([2\pi/\lambda] \cos \theta) d_{eff}$.

Figure 3A:
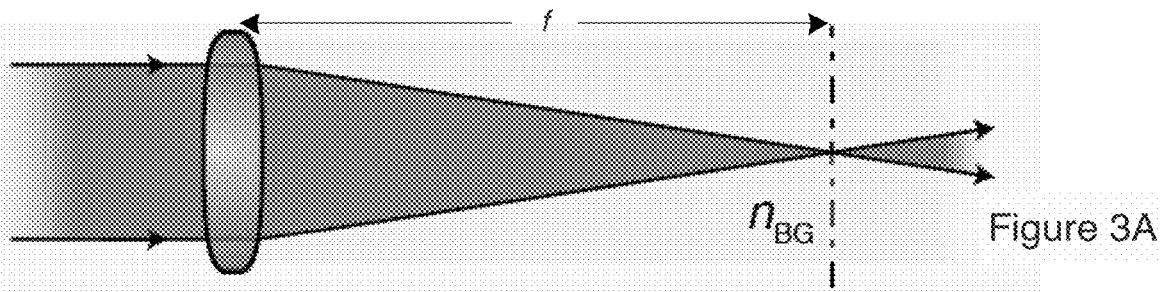
Figure 3B:
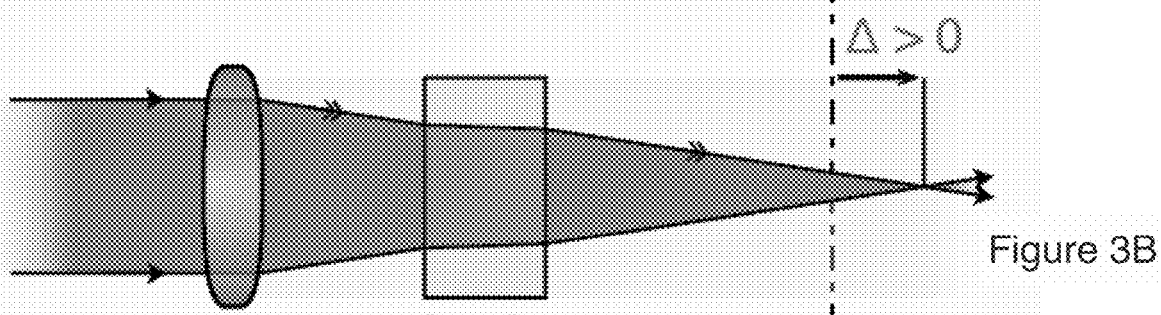

In order to provide a better understanding of what material(s) may be employed to produce a spaceplate, one may first consider whether such a spaceplate may be a homogeneous optical medium, such as glass. In an interferometer situated in a vacuum background ($n_{BG}=1$), a glass plate of index n=1.5 and thickness d may replace the 'optical path length' $d_{eff}=1.5d$ of interferometer arm length. This may be contrasted with the action of the same glass plate on the focus location of a beam propagating in vacuum, as schematically depicted in FIGS. 3A and 3B. Counter to the intuition derived from the interferometer, refraction at the plate boundaries will make the focus shift further along the propagation direction, as if it had passed through $d_{eff}=d(n_{BG}/n)=(d/1.5)$ distance in vacuum. For example, the lens of FIG. 3A focuses a collimated beam at a working distance corresponding to its focal length f. On the other hand, the physical distance to the point of focus is increased by a length A when a plane-parallel plate with a refractive index n that is larger than that of the background medium $n_{BG}$ is inserted into the beam path (FIG. 3B). While the emerging rays are parallel to the original incident rays, which preserves the lens strength, in this example, each incident optical ray in FIG. 3B experiences a translational shift away from the lens relative to these same optical rays otherwise propagating in free space as shown in FIG. 3A (i.e. an expanding transverse shift "against" the direction that light was propagating relative to a surface normal, that is a translational shift in an outward direction that results in a relative broadening of the otherwise converging/focusing beam once at the output of the plane-parallel plate).

This is the opposite effect to what is sought with embodiments of a spaceplate in which space is compressed, and thus highlights that the concept of optical path length is not appropriate for a spaceplate. Stated differently, and in accordance with various embodiments, a spaceplate material may be considered to be one in which incident light effectively bends away from the normal of a spaceplate surface, rather than towards the normal in, for instance, embodiments in which an image is brought into focus. Indeed, each optical ray incident on the spaceplate in the example of FIG. 3C experiences a translational shift towards the spaceplate (i.e. a narrowing transverse shift which results in an effective narrowing of the converging/focusing beam relative to what the beam would have experienced in the absence of a spaceplate) while maintaining the incident/output angle (i.e. angular distribution of the light field). For the sake of the following description, we can thus define a positive translational shift as one that is in the direction of the spaceplate, or, with respect to the plane of the surface of a spaceplate, one that is inwards for a converging beam and outwards for a diverging beam (vertical shift in FIG. 3C). In other words, a spaceplate "accelerates" a beams convergence or while maintaining a converging/diverging angle at the output. In one embodiment, as described below, an index of refraction of the spaceplate that is smaller than a surrounding medium may impart the desired effect. As detailed below, this solution in fact corresponds to one particular embodiment derivable and/or approximated upon otherwise seeking to design a spaceplate in which an angle-dependent phase response @ of the spaceplate is tailored to achieve the desired response by introducing an angle-dependent refractive index.

In accordance with various aspects of the disclosure, the identification and implementation of a material with such a profile (e.g. a refractive index as a function of the k-vector angle within a medium $\Phi_{SP}$) may be resolved to obtain the following relationship:

$$\frac{n(\theta_{SP})}{n_{BG}} = \frac{C + \sqrt{C^2 + (\mathcal{R}^2 - C^2)(1 + (\mathcal{R}^2\tan^2\theta_{SP})}}{(1 + \mathcal{R}^2\tan^2\theta_{SP})\cos\theta_{SP}}$$

where $C=(\phi_G+2\pi m(\theta_{SP}))/\phi_{BG}(0,d)$. Such a medium may be homogenous and/or non-isotropic. If a plate's refractive index varies in such a fashion, and in accordance with various embodiments, a plate may act like a factor R greater than the plate thickness. That is, it may act as a spaceplate for a background medium with refractive index $n_{BG}$. Accordingly, C may be an arbitrary constant, and a spaceplate may still function as a space compression medium with a compression factor R.

The desired index profile will now be discussed in more detail, with various non-limiting solutions presented that are physically realisable. For illustrative purposes only, and not intended to limit the scope of the disclosure, further discussion will assume m=0 for all angles. Since $\Phi_G$ is still arbitrary, so is C. Thus, C parametrizes an infinite family of solutions, some of which are shown in FIG. 4 as various non-limiting examples of angle-dependent refractive index curves related to homogenous media, in accordance with various embodiments.

Figure 3C:
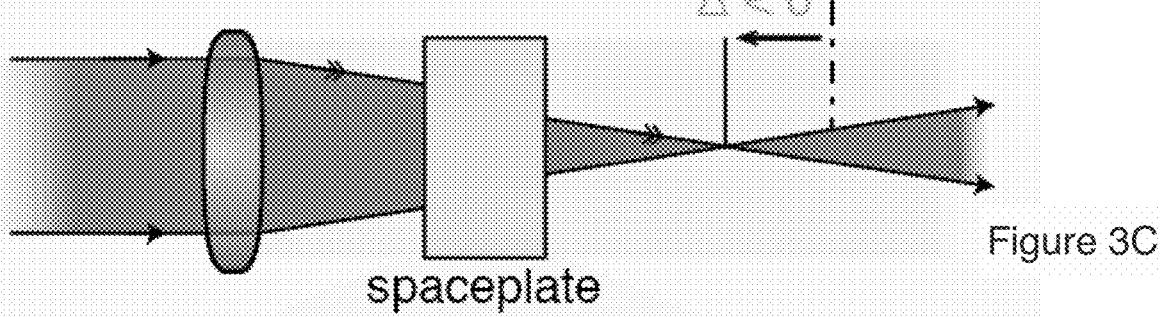
Figure 3D:
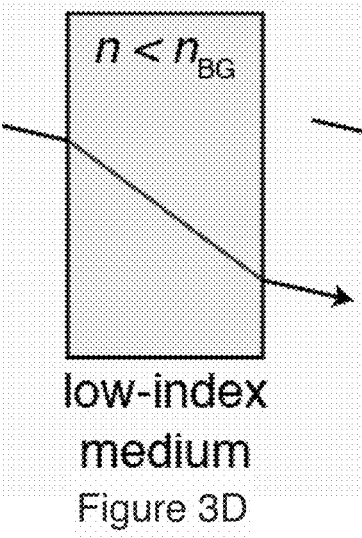
FIGS. 3D to 3F are schematic diagrams of various spaceplate media, in accordance with various embodiments.
Figure 3E:
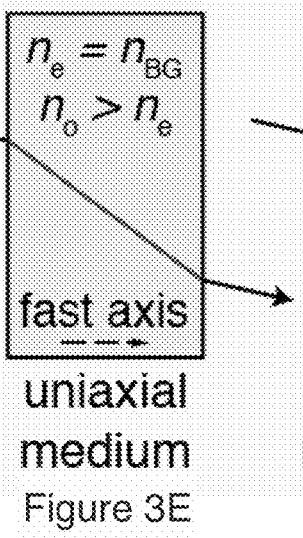
Figure 3F:
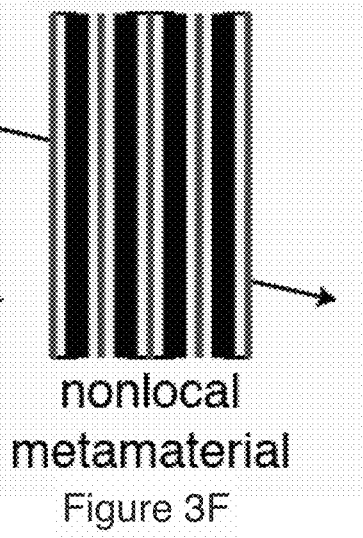

FIG. 3C schematically illustrates the operation of a spaceplate which satisfies the abovementioned condition. A spaceplate, in accordance with various embodiments, will act to advance the point of focus while also preserving the lens strength. The plate therefore effectively propagates light for a longer length than the physical space it occupies. Three non-limiting examples, in accordance with various embodiments and which are described in greater detail below, employ a plane-parallel plate with an angle-independent refractive index n<$n_{BG}$ (FIG. 3D), a uniaxial birefringent medium with $n_{BG}=n_e$ (FIG. 3E), or a nonlocal metamaterial (FIG. 3F).

Figure 4:
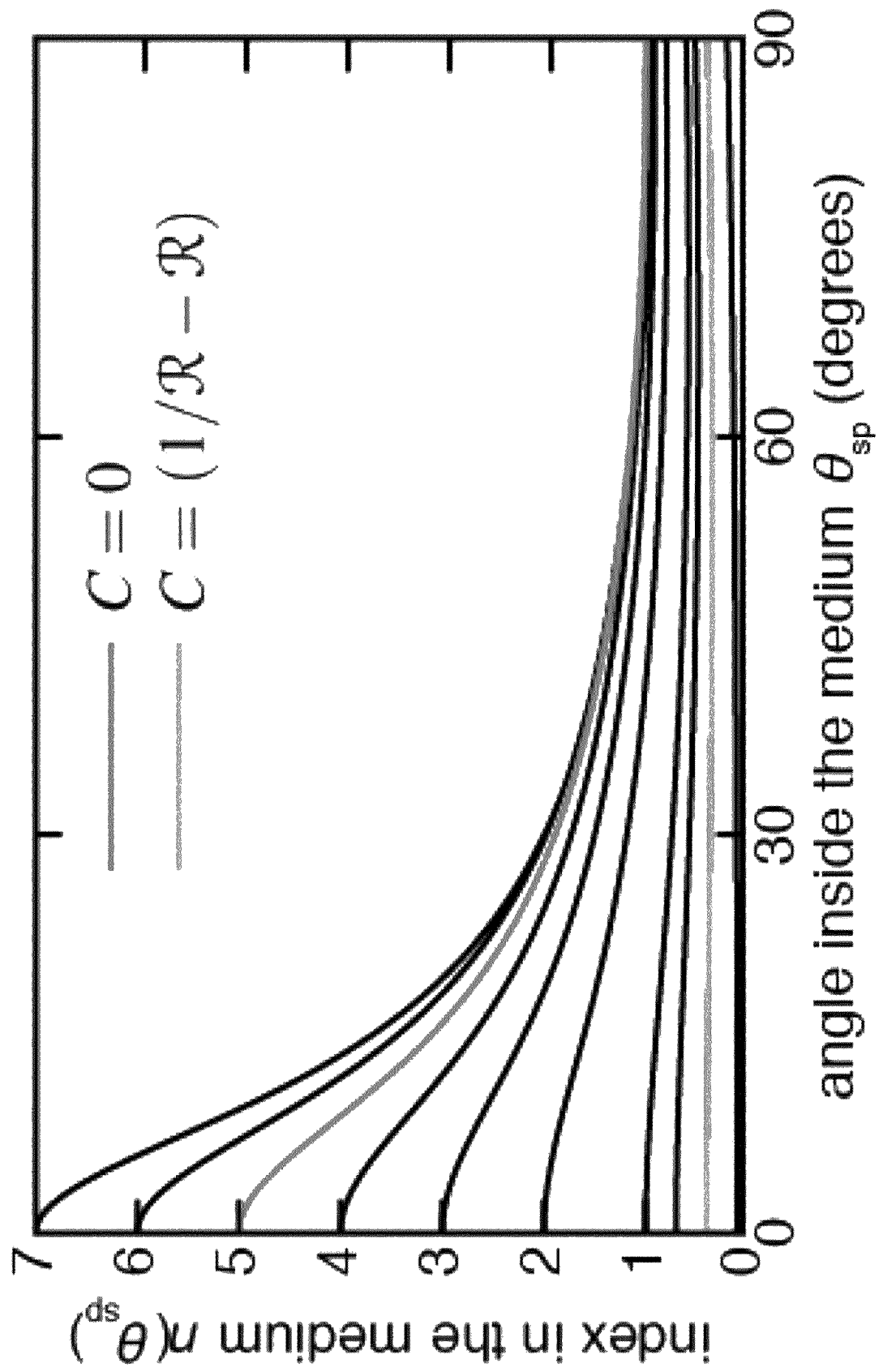
FIG. 4 is a plot of derived angle-dependent refractive index curves representative of different homogenous materials that may be employed in a spaceplate, in accordance with various embodiments.

A potential solution of a homogeneous medium comprising an angle-dependent refractive index, and in accordance with various embodiments, is one which satisfies $n(\theta_{SP})$<$n_{BG}$ for all angles, or the solution for C=(1/R–R) of FIG. 4. This solution is the flattest of any of the potential solutions and thus corresponds to an approximately isotropic medium $n(\theta_{SP})=n_{LI}$, particularly for small incident angles. This is similar to the glass plate discussed above, but where the index of the plate $n_{LI}$ is less than that of the background medium $n_{BG}$, so $d_{eff}=(n_{BG}/n_{LI})d$ is greater than d. For this low-index spaceplate, R=$(n_{BG}/n_{LI})$. If the background medium is vacuum, then nu must be less than one, a seemingly unusual property. Nonetheless, there exist both natural and metamaterials (e.g. epsilon-near-zero materials, or ENZ materials) from which such a spaceplate can be made, in accordance with various embodiments. With such a "low-index spaceplate", a beam focus may be shifted towards the plate, as if the beam had propagated through an additional length of the background medium, effectively reducing the required distance along z, as in FIG. 3C.

A second realisable homogeneous solution is one for which C=0. Since this solution has no global phase offset ($\Phi_G=0$), not only may it act as a spaceplate for imaging, it will also replace $d_{eff}$ in an interferometer, in accordance with various embodiments. Such a solution is related to, but is distinct from, a solution from transformation optics that compresses the full electromagnetic field. Remarkably, the refractive index described by this solution is that of a negative uniaxial birefringent medium ($n_o$>$n_e$ for ordinary (o) and extraordinary (e) polarizations) with its e-axis along z. A light field with e-polarization propagating through such a medium experiences a compression factor of R=$(n_o/n_e)$ along Z.

In accordance with various aspects, a birefringent material, although comprising polarization-dependent indices of refraction that are higher than or equal to a surrounding medium, may therefore serve as a spaceplate. In various embodiments, the optic axis of a birefringent material may be parallel to the normal of the material surface on which light is incident, and/or may utilise a walk-off effect to bring light into focus sooner than would otherwise occur in the absence of the medium.

In accordance with various embodiments, a non-limiting example of each of the two abovementioned approaches to implementing a spaceplate, namely the low-index and uniaxial spaceplates, will now be described with reference to experimental results. It will be appreciated by the skilled artisan that different homogenous materials and media may be considered that satisfy the exemplary solutions illustrated in FIG. 4, and that further such materials and media may be developed or discovered that also satisfy such criteria. Accordingly, the following and further such examples should be considered to fall within the general scope and nature of the present disclosure.

Figures 5A, 5B:
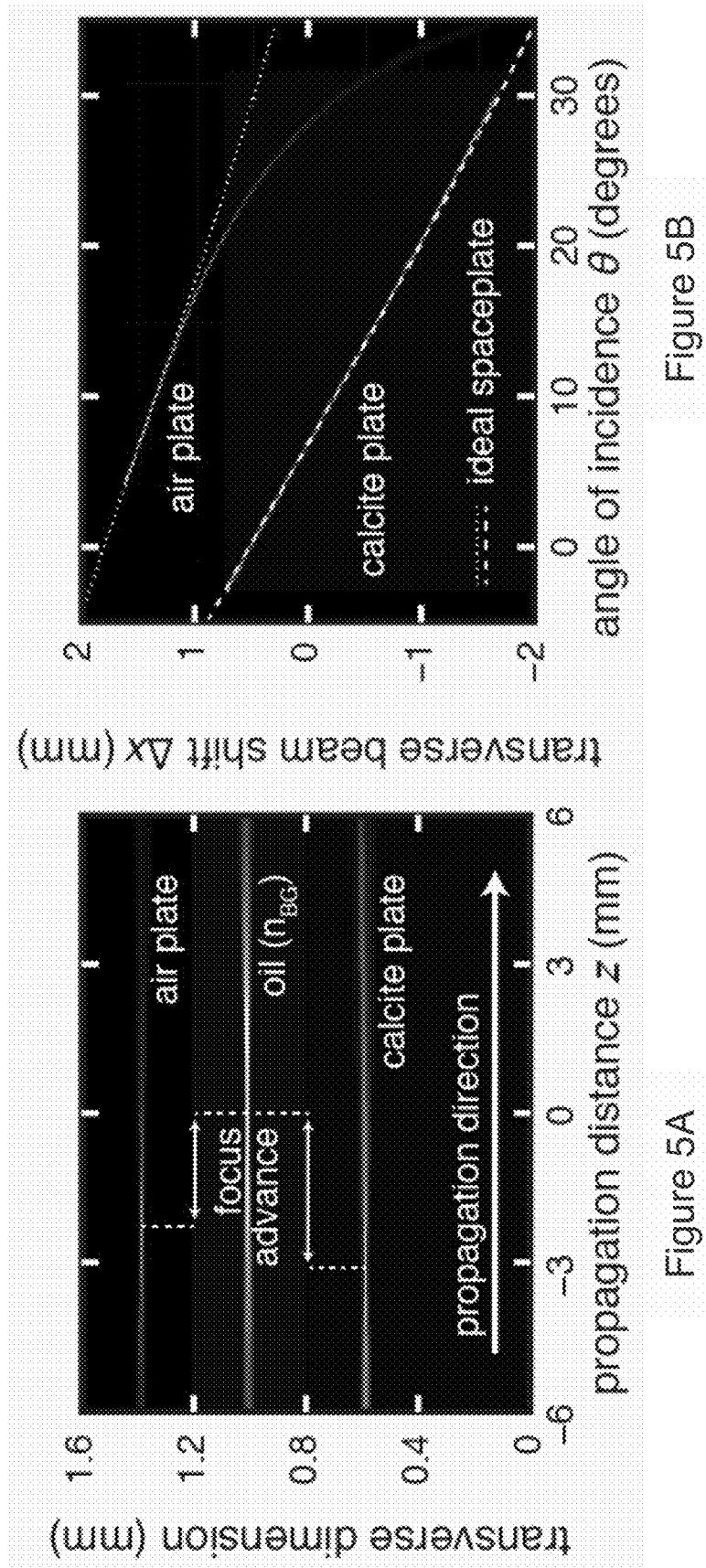
FIG. 5A is a plot showing focus position advance for two examples of spaceplates.
FIG. 5B is a plot of theoretical and corresponding experimental transverse beam shifts as a function of incidence angle resulting from the spaceplates in FIG. 5A, in accordance with various embodiments.

Conventional low-index (i.e. n<1) materials are typically lossy. As such, rather than the use of vacuum, a background medium with a higher refractive index (e.g. linseed oil, $n_{BG}$=1.48) is discussed, while air was used as the low-index medium, in accordance with one embodiment. It will be appreciated that low-index media may nonetheless be considered herein to complement embodiments implemented in air or vacuum, without departing from the general scope and nature of the present disclosure. The low-index plate in this example is a d=4.4 mm long cylinder containing air and faced with glass coverslips. With air as the low index medium ($n_{LI}$=1), the resulting factor is R=1.48. With reference to FIG. 5A, a focusing beam is propagated through the oil and compared to the same beam when propagating through the low-index plate placed in the oil. An ideal spaceplate will shift this focus by $\Delta = d - d_{eff} = -d$ (R-1). In FIG. 5A, the addition of the low-index plate clearly shifts the focus towards the spaceplate. The measured shift is $\Delta = -2.3$ mm, which agrees well with the predicted shift of $\Delta = -2.1$ mm.

This measurement was repeated with the other abovementioned form of a homogenous spaceplate, the uniaxial crystal (also shown in FIG. 5A). In this example, a d=29.84 mm long calcite crystal ($CaCO_3$, R=1.12) plate with its optic axis oriented perpendicular to its entrance and exit faces, in accordance with various embodiments. In this non-limiting example, the spaceplate is placed in linseed oil, which was chosen to match the $n_e$ of calcite, although this is not necessarily required (e.g. glycerol, or another appropriate medium may be used). The focus of an e-polarized beam upon passing through the uniaxial plate is advanced by $-3.4$ mm, in good agreement with the predicted advance of $\Delta = -3.5$ mm. In both examples of FIG. 5A, the spaceplates advance the focus of a beam, in accordance with various embodiments, as if the respective beams had passed through an additional length of the background medium.

Figure 13B:
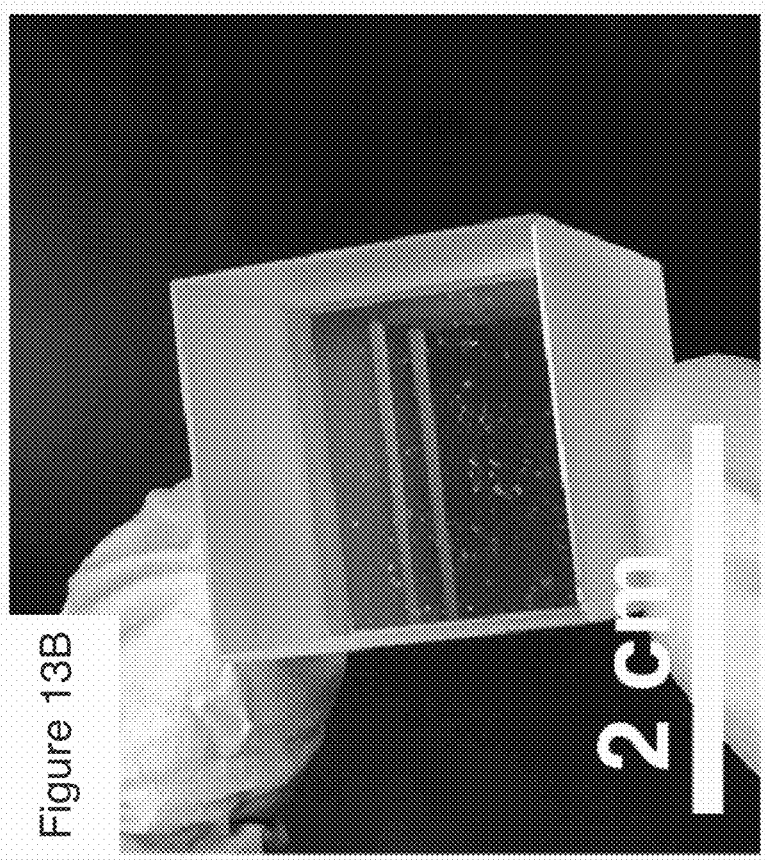
FIGS. 13A and 13B are photographs of a low-index spaceplate and a uniaxial spaceplate, respectively, in accordance with various embodiments.
Figure 13A:

To summarise, FIG. 5A highlights the focal shift, $\Delta = d - d_{eff}$ with and without homogeneous spaceplates. In this example, the middle dataset shows a converging beam focusing in oil (no spaceplate) at z=0. The top dataset shows propagation of a similarly converging beam upon passing through a spaceplate of air, advancing the focus position along z by $\Delta = 2.3$ mm. The bottom dataset shows propagation of an extraordinary polarized beam through a calcite crystal with its fast axis along z, with the focus position advancing by $\Delta = 3.4$ mm. In this example, the wavelength of light used was 532 nm. Images of low-index and uniaxial spaceplates may be seen in FIGS. 13A and 13B, respectively.

In accordance with various embodiments, a spaceplate may produce a transverse beam displacement. In this example, the angle of incidence of the beam $\theta$ is varied with respect to the spaceplate interface normal, and the beam's lateral displacement ($\Delta x$ in FIG. 1) is recorded upon exiting (FIG. 5B). For both types of spaceplates in FIG. 5A, for small angles, the observed displacement $\Delta x$ is equal to the ideal displacement of a beam travelling through $d_{eff}$ of the linseed oil at angle $\theta$ (dashed theory curves, wherein $\Delta x = -d$ (R-1) sin $\theta$). However, for larger angles, the displacement induced by the low-index plate deviates from that of an ideal spaceplate. In an imaging system, this discrepancy may act to introduce optical aberrations. This deviation may be due to the failure of the small-angle approximation, most dramatically near the onset of total internal reflection at $\theta_{crit}$=42.5. Beyond this aberration, total internal reflection may impose a limitation on the low-index spaceplate; as its refractive index nu decreases, its acceptance angle decreases as $\theta_{crit}$=arcsin $(n_L/n_{BG})$=arcsin (1/R). Consequently, for the low-index spaceplate, the greater the compression factor is, the smaller the numerical aperture (NA) may be. In contrast, the calcite crystal, in this example, was found to almost perfectly reproduce the free space displacement for all measured angles. Nevertheless, both spaceplates herein presented act like a larger propagation distance in oil for small angles.

While the abovementioned spaceplates provide, in accordance with various embodiments, examples of homogeneous media that may comprise a spaceplate, other candidates exist that satisfy the material properties that produce the effects herein disclosed. For example, a metamaterial, or a material based on a multilayer stack (e.g. a structure comprising parallel flat layers of various media, or nanostructured layers which may optionally not be flat), may also comprise a spaceplate. Such a device may not necessarily depend on naturally occurring media for performance, but may additionally or alternatively be engineered to possess much larger compression factors than those described above. With the layer normals along z, this class of structure may satisfy the condition of translational invariance, like the homogeneous spaceplates discussed above. Again, and as a non-limiting example only, one may enable this via reproducing the transfer function H of a $d_{eff}$ of free space in a structure of thickness d. One method may, in accordance with various embodiments, be to create a negative uniaxial medium by alternating layers of two or more materials (or alternating sub-wavelength-thick layers of more than one material). This may create an advantageous uniaxial spaceplate in that, for instance, the birefringence (and thus R) may be large. Alternatively, or additionally, such a material may be slowly varied along z to avoid, for instance, reflection at the interfaces.

Non-limiting examples of multilayer spaceplate structures are, and in accordance with various embodiments, those that may reproduce a transmitted angular phase profile $\Phi$. Such structures may be designed in consideration of this constraint, chosen based on simulated properties, or selected for using computations algorithms and/or simulations, a non-limiting example of which may be a genetic algorithm or other similar method known in the art to simulate, model, or design a material based on automated or semi-automated computation.

In accordance with at least one embodiment, a non-limiting example of a genetic algorithm that may be used to determine a spaceplate composition will now be described. The skilled artisan will appreciate that not all elements herein described are required, and some aspects may be replaced and/or added to in an algorithm without departing from the general scope and nature of the disclosure. In one embodiment, an algorithm may seek to replace a background medium of vacuum with a structure that gives a phase profile $\Phi_{SP}$ that matches the phase profile $\Phi_{BG}(d_{eff})$ resulting from propagation through a slab of vacuum of length $d_{eff}$. This aim may be restricted to a range of incident angle from zero to $\theta_{max}$ (i.e. the NA of the spaceplate). The search may be conducted with a genetic algorithm whose goals are to maximize $d_{eff}$ while minimizing any optical aberration from a non-ideal phase profile. To quantify the latter goal, the difference of the slope from that of the ideal profile, $\Delta \Phi' = \Phi'_{SP} - \Phi'_{BG}$, may be calculated, where $\Phi' = \delta f/\delta \theta$. This angular slope is the relevant quantity to consider since any global phase $\Phi_G$ and phase wraps $2\pi m$ will be eliminated by the derivative. The root-mean-square (RMS) of this difference, $\Delta \Phi'_{RMS}$ may then be found. The RMS deviation $\Delta \Phi'_{RMS}$ may be an optical aberration that results in an increased beam waist $\omega_{SP} = \omega_0 (1 + \theta_{max} \Delta \Phi'_{RMS})$ relative to the waist $\omega_0 = \lambda/(\pi \theta_{max})$ in the absence of the multilayer stack. As a worst-case scenario, this larger waist may increase the Rayleigh range to $\omega_{SP} = \omega_{SP}^2/\lambda$. The parameter $z_{SP}$ may increase with aberration and the inverse of the usable angle $\theta_{max}^{-1}$. The two goals of the algorithm may be combined in a single fitness function, $F=d_{eff}/z_{SP}=\pi d_{eff}\theta_{max}^2/(\lambda(1+\theta_{max}\Delta\Phi'_{RMS})^2)$, where the small-angle approximation may be used repeatedly. The larger the value of F is, the better the performance of the multilayer spaceplate may be.

The functioning of a genetic algorithm, in accordance with one of the various embodiments, will now be described. Each generation in a genetic algorithm may have a population size of 200. The DNA of each population member may be the material and the thickness of each layer in a stack. In one example, materials may be silica and silicon. The maximum number of layers may be set to 40 and each layer may be constrained to have a thickness greater than 10 nm. For each member, a standard transfer matrix formalism may be used to calculate the complex transmission amplitude $H=|H|\exp(i\Phi_{SP})$ of the multilayer stack for a set of incident angles θ. A nonlinear regression may be used to fit $\Phi_{SP}$ with an ideal phase profile $\Phi_{BG}(d_{eff})$, giving $d_{eff}$ and, with this fit, $\Phi'_{RMS}$ may be numerically calculated. Both the fit and calculation may be conducted over a range of input angles from zero to $\theta_{max}=15$. With these performance parameters the fitness F may be found of each population member. The device thickness of the first generation may be 10 mm, but this parameter may not be constrained for later generations. The algorithm may be carried out until there was a convergence in the fitness of the "best" member of each generation. For the structure reported herein, this took 4000 generations.

Figure 6:
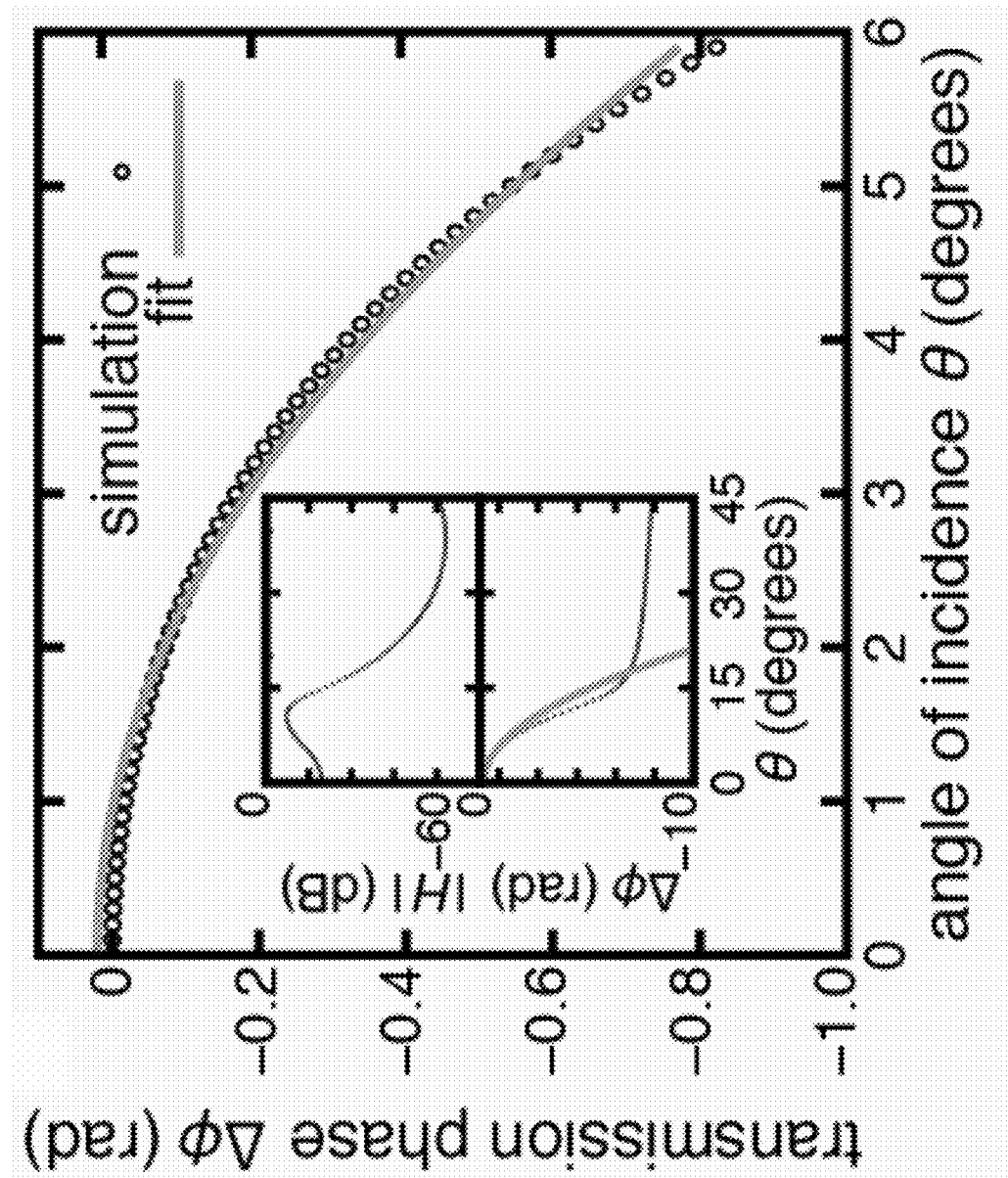
FIG. 6 is a plot of a transmission phase and magnitude as a function of angle of incidence for a multilayer spaceplate, in accordance with at least one of the various embodiments.
Figures 14A, 14B:
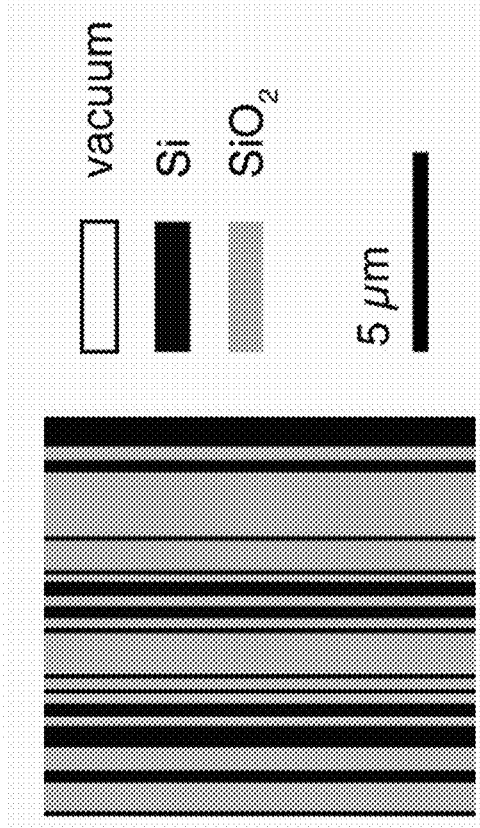
FIGS. 14A and 14B are a schematic diagram of a non-local multilayered spaceplate metamaterial and a table comprising its constituent layer properties, respectively, in accordance with at least one of the various embodiments.

An example of a medium that may be used as a spaceplate, in accordance with one embodiment, is one simulated using a genetic algorithm and comprising two materials for a thickness d=10.1752 μm. This non-limiting example comprises a 25-layer structure, and may act as a polarization-insensitive spaceplate with a compression factor of R=3.6 for vacuum-filled space up to an incident angle of θ=6 degrees, as shown in FIG. 6. This non-limiting example comprises a multilayer stack of alternating layers of silicon and silica of various thicknesses and is engineered to reproduce the Fourier transfer function H of vacuum for incident angles smaller than θ=15 degrees at an optical wavelength of λ=1550 nm. A schematic representation of the structure of this non-limiting example of a metamaterial spaceplate is shown in FIG. 14A, with layer properties tabulated in FIG. 14B. Plotted in FIG. 6 is the calculated transmission phase $\Phi_{SP}$ of the metamaterial spaceplate and a fitted vacuum transfer function phase $\Phi_{BG}$ conducted over a 6-degree range. The fitted compression factor is R=3.6. The inset shows the phases over a larger angle range, as well as amplitude |H|.

FIG. 7 shows an example of a full-wave simulation of the structure described, which highlights that this structure advances the focus of a converging beam in vacuum towards the plate, in accordance with one embodiment, by Δ=−39.4 μm, which approximately agrees with the expected shift of −36.6 μm. In this example, the full-wave simulation in FIG. 7A shows the magnitude of the electric field |E| of a focusing Gaussian beam (waist of 3λ, divergence of 6 degrees) propagating in vacuum (FIG. 7B), and after propagating through the metamaterial (FIG. 7C). The corresponding structures (vacuum and spaceplate, FIGS. 7A and 7D, respectively) are to scale. A cross section of $|E|^2$ along the beam axis is shown in FIG. 7E. In accordance with various embodiments, such simulations may be employed to investigate spaceplate properties for various polarisations.

In accordance with various embodiments simulations of spaceplate behaviour may be performed using a commercial finite-difference time-domain solver, and may optionally be a 2D solver.

Unlike the uniaxial or low-index spaceplate embodiments described above, the compression factor R of this structure exceeds the ratio of any of the indices in the spaceplate ($n_{Si}$~3.48, $n_{SiO2}$~1.45, $n_{vac}$=1). Hence, and in accordance with various embodiments, material index ratios are not a fundamental limit on R. In accordance with various embodiments, more complicated structures of multilayer stacks may comprise spaceplate designs, including, but not limited to those with compressions factors exceeding that of the above-mentioned example. Indeed, the example described is so done as it is a relatively simple multilayer structure, and those that are more complex, for instance those that comprise more than two materials, or those with more highly variable layer thicknesses, lie within the scope of this disclosure.

In accordance with various embodiments, multilayer stacks may be designed to be approximately 10 μm thick, and/or have arbitrary thickness. In yet further embodiments, layers can have arbitrary thicknesses larger than ~ 10 nm.

In accordance with at least one embodiment, the experimental performance of a uniaxial spaceplate to reduce the size of a complete imaging system, as described above, is shown in FIGS. 8A to 8C. In this non-limiting example, a print of the painting in FIG. 8A is illuminated using an incoherent visible light source. Here, a lens system forms an image of the print at an image plane inside a tank of glycerol placed after the last lens of the system. In order to probe image formation, the field's transverse intensity distribution is captured by an image sensor (e.g. a CCD) effectively positioned at propagation distance z, which is varied. At z=0, FIG. 8B shows that the captured image is in sharp focus, as were the beams in FIG. 5. At the position z=−3.4 mm, the captured image is out of focus, as it has not propagated far enough to fully form. FIG. 8B shows images captured at a series of different positions z along system axis. The images on the bottom row of FIG. 8B are the corresponding captured images with the calcite crystal comprising the spaceplate placed in the oil before the image plane. Here, the image is faithfully restored at an advanced position of z=−3.4 mm. Furthermore, and in accordance with various embodiments, the magnification of the image is preserved, as evidenced by a comparison of the images at their respective focal planes. Thus, the lens system has been shortened without changing the field of view, NA, or magnification, in accordance with various embodiments. In contrast, shortening the lens system by, for instance, reducing the lens focal lengths, would change all three of these important imaging system parameters. Finally, the entire color image remains in focus simultaneously, illustrating the broadband operation of the uniaxial spaceplate.

In accordance with various embodiments, a uniaxial spaceplate acts to replace space for e-polarized light. However, e-polarization direction may vary depending on the angle of the incident wavevector relative to the optic axis. In order for the incident light field to be simultaneously e-polarized and approximately uniformly polarized along one direction, a spaceplate may be tilted slightly about an axis by an angle α relative to the incident beam (and system axis). The tilt is α=4.5 degrees for the calcite spaceplate in FIG. 5A (about the y-axis), and α=8 degrees for that in FIGS. 8A to 8C. An x-polarized light field may then be e-polarized with respect to the crystal. A y-polarized field may then be o-polarized. For the laser, in these examples, the incident polarization may be set by a polarizing beam splitter followed by waveplates. The polarization of the white light may be set by a film polarizer designed for broadband visible light, in accordance with various embodiments.

Figure 9:
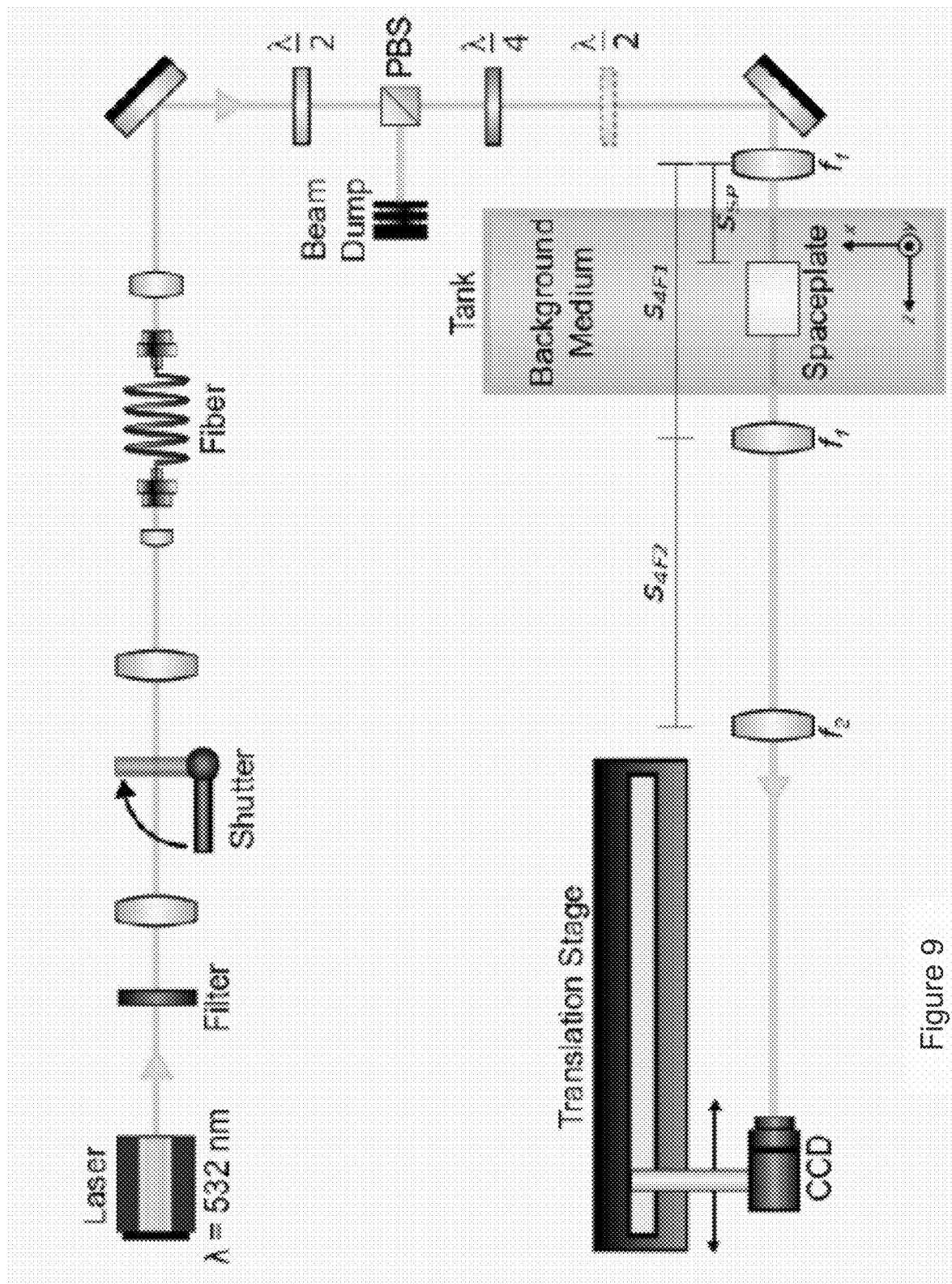
FIG. 9 is a schematic diagram of an optical system for measuring the action of a spaceplate, in accordance with at least one of the various embodiments.
Figure 10:
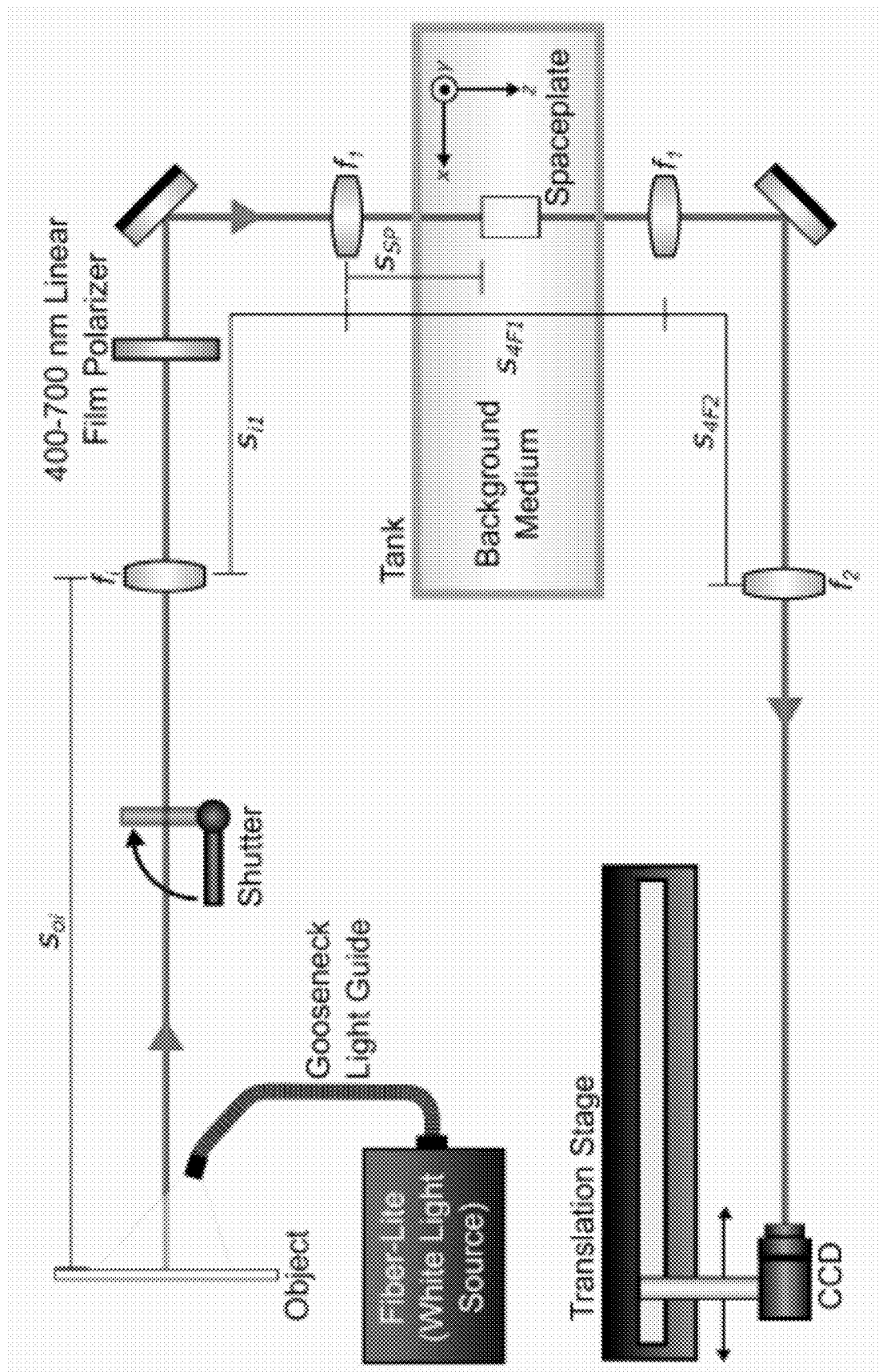
FIG. 10 is a schematic diagram of another optical system for performing full colour imaging through a spaceplate, in accordance with at least one of the various embodiments.

With reference to FIGS. 9 and 10, different optical setups are presented to measure the action of a spaceplate (FIG. 9), in which a beam is focused through a spaceplate and its shift in x and z is measured relative to a substantially identical beam in a background medium; and to preform full colour imaging through a spaceplate (FIG. 10) and observe the action of the spaceplate relative to the same imaging conducted solely within a background medium in the absence of the spaceplate, in accordance with different embodiments.

Figures 11A, 11B, 11C:
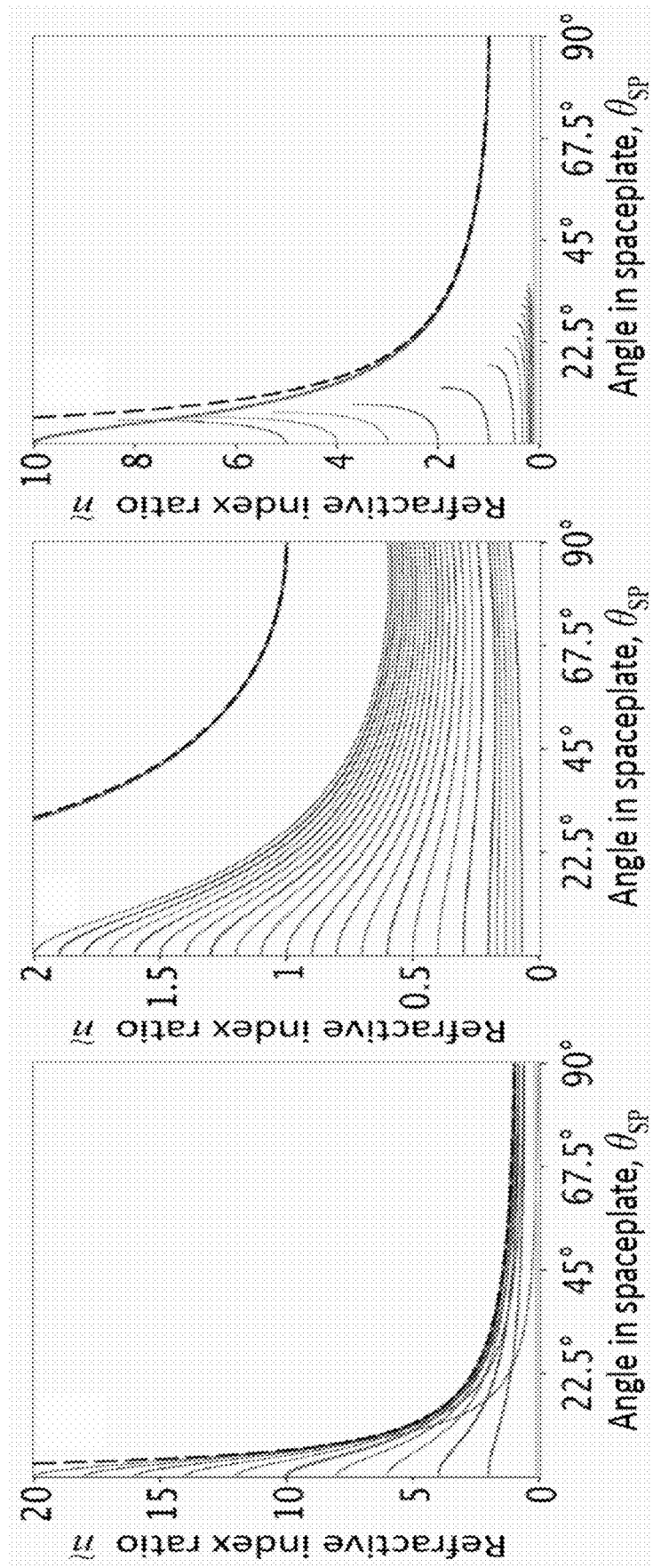
FIGS. 11A to 11C are plots of various exemplary positive and negative root general angle-dependent refractive index solutions for a spaceplate, in accordance with various embodiments.
Figure 12:
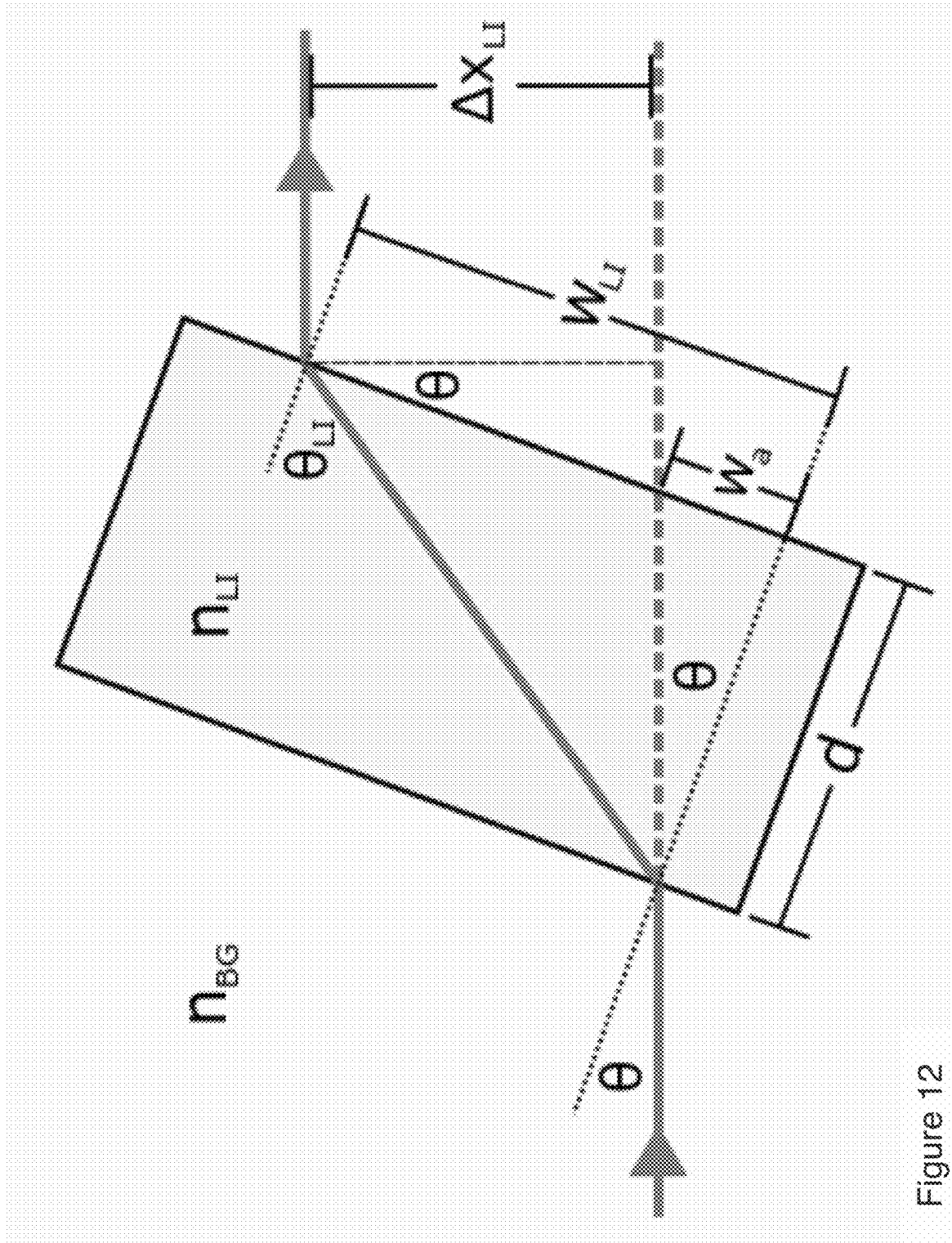
FIG. 12 is a schematic diagram of an exemplary geometry of a low-index spaceplate, in accordance with various embodiments.

In accordance with various embodiments, non-limiting general angle-dependent refractive index solutions for a spaceplate may be seen in FIG. 11. In particular, plotted is the index ratio $n(\theta_{SP})/n_{BG}$, and all solutions are for R=10. FIGS. 11A and 11B correspond to positive root solutions, while FIG. 11C corresponds to negative root solutions. Many other solutions are possible, which are also in accordance with various embodiments. Namely, the negative of the plotted curves, i.e. in which the same curves are observed but for negative n, also represent applicable solutions. The parameters for the derivation of one such embodiment, that of the low-index spaceplate, are presented in FIG. 12, which illustrate the various abovementioned parameters.

Multiple methods could be employed to improve the performance of spaceplates demonstrated herein, in accordance with various embodiments. For instance, the low-index and uniaxial designs may be combined (i.e., $n_{LI}=n_e<n_{BG}$) to enhance the compression:

$$\mathcal{R} = \frac{n_o}{n_e}\frac{n_{BG}}{n_e}$$

In recent years, much attention has been given to engineering optical media with refractive indices below unity, which may enable a low-index spaceplate for vacuum. However, replacing vacuum may not always be desirable. A higher NA in an imaging system, in accordance with various embodiments, may be enabled via a higher index media, which could be used with lenses that are not based on refractive lensing (e.g. zone plates and metalenses).

Similarly, strongly anisotropic responses are routinely produced using thin-film stacks and metamaterials. In accordance with various embodiments, a uniaxial spaceplate with a large R, may be produced by incorporating low-index materials in such stacks to produce even larger birefringence and/or enhancement of the spaceplate functionality. Alternatively, or additionally, dynamic birefringent materials (e.g. liquid crystals) may be employed, in accordance with various embodiments, to develop devices of variable compression ratios. For example, such a system may be useful in a variable-focus lens system.

Broadly, a spaceplate as described herein may comprise an optical element that operates directly on the phase of transverse Fourier components of a light field. For instance, one may control the transmittance of such Fourier components (the so-called 'nonlocal' response). This transmittance control may enable a broadband angular pass-filter and analog optical computations, such as derivatives and spatial imaging. Combining transmittance and phase control, in accordance with various embodiments, may enable some or all of the benefits of Fourier optics (e.g., spatial filtering) without requiring a lens system to access the far field. In turn, repeatedly iterating between such transverse Fourier control and position-dependent control may enable fully arbitrary spatial transformations of light fields. The use of, for instance, multilayer metamaterials and metasurfaces to respectively accomplish these two controls, in accordance with various embodiments, may enable enhanced or complete spatial control of light in, for instance, a monolithic device. Furthermore, in accordance with various embodiments, a spaceplate may influence light propagation within a waveguide system.

In accordance with various embodiments, a spaceplate may be employed to enable the placement of cameras in novel locations. As cameras would be less limited by conventional optics ratios, they may not be required to be as physically small. For instance, a camera may occupy a larger region of a smartphone (e.g. the entire back side of a smartphone). Additionally, or alternatively, a spaceplate may preclude the "camera bump" in conventional systems.

A spaceplate may also, in accordance with various embodiments, be of use in next-generation optics systems. For instance, as the development of metalenses and metamaterials improve (e.g. materials become less lossy and/or more readily or cheaply produced), a spaceplate may be used in conjunction with, for instance, a metalens and/or materials that do not rely on differences in indices of refraction in order to focus light, in accordance with various embodiments. In yet other embodiments, a spaceplate may improve virtual reality or augmented reality systems. While conventional systems, the associated headsets, and/or user experiences may be limited by, for instance, the various distances between eyes, lenses, and/or displays, a spaceplate may reduce and/or eliminate challenges related to field of view and magnification, and may enable more widespread adoption of such systems.

Various embodiments may also relate to materials which approximate the abovementioned angle-dependent phase response (e.g. a low-index medium). For example, and in accordance with another embodiment, a spaceplate may comprise a photonic crystal.

As described above, the output phase of a spaceplate may follow the relationship $\varphi=2\pi n_{BG}\, d_{eff}\cos(\theta)/\lambda$, where $n_{BG}$ is the index of the background medium, $d_{eff}$ is the amount of space in the background medium that the spaceplate replaces, $\theta$ is the incident angle of light, and $\lambda$ is the operating wavelength. The function of a spaceplate, in accordance with some embodiments, is to effectively make light propagate a distance $d_{eff}$ while occupying a space d, where $d<d_{eff}$. In accordance with some embodiments, a spaceplate may be characterised by a compression factor R defined as the ratio $R=d_{eff}/d$. While a ray propagating through, for instance, a metalens may experience a change in the direction upon exit while maintaining its position in the x-y plane, a ray propagating through a spaceplate may be translated in the x-y plane equal to the translation it would have experienced while propagating through a distance $d>d_{eff}$, while preserving propagation angle $\theta$. However, it will be appreciated that various embodiments of a spaceplate, as herein disclosed, may allow for small or relative changes in propagation angles of light upon entry/exit of the spaceplate, while still performing as a space compression medium. For example, a spaceplate may substantially maintain an angular distribution of incident light to within a designated tolerance or error upon exit (e.g. <5% deviation in propagation angles within an angular distribution). Alternatively, or additionally, a spaceplate may exhibit a compression factor greater than 1 while introducing a shift or offset to an angular distribution of light incident thereon. For example, incident light having an incident angular distribution may exit a spaceplate medium with a substantially similar angular distribution (e.g. set of propagation angles relative to one another), but having included an arbitrary offset angle. Such embodiments may be understood, for illustrative purposes only, as a spaceplate that adds an offset angle (e.g. 7 degrees) to each propagation angle of an incident angular distribution. For example, light having an incident angular distribution comprising propagation angles between −20 degrees and 20 degrees may exit a spaceplate with a substantially similar angular distribution comprising propagation angles between −27 degrees and 13 degrees. Accordingly, various embodiments of a spaceplate relate to a medium that maintains, substantially maintains, and/or substantially maintains up to an arbitrary offset angle, an angular distribution of light.

Further, and in accordance with some embodiments, a spaceplate may be further characterised using a Strehl ratio. Typically a ratio used in measuring the quality of lenses, this ratio (i.e. the ratio of the peak intensity of a beam propagating through an ideal lens versus a real lens) may be used to determine, for instance, a degree of aberration of a spaceplate. For example, and in accordance with at least one embodiment, a Strehl ratio may be applied to characterise spaceplates by assuming incoming light to be focused by a perfect lens, such that any or all aberration may be assumed to arise from the spaceplate.

As described above, a spaceplate may, in accordance with various embodiments, comprise various layers of a different materials. For example, in accordance with some embodiments, a spaceplate may comprise alternating layers of two different materials (e.g. Si and $SiO_2$), or may comprise various configurations of layers comprising more than two materials. It will therefore be appreciated that while the following description relates to embodiments of a spaceplate comprising alternating layers of Si and $SiO_2$, various other embodiments may relate to spaceplates comprising different and/or more materials and/or layer configurations. Such spaceplates may also be referred to herein as "multilayer stacks".

Spaceplate configurations may, in accordance with some embodiments, be determined using various computational processes. For instance, and in accordance with some embodiments, a spaceplate configuration may be determined using a gradient descent process, wherein calculations may be performed in accordance with following a gradient of a computed parameter until a peak is reached. Such a process may in turn comprise various parameters and/or optimisation variables. For instance, some embodiments relate to the application of a gradient descent process to determine layer thicknesses in a multilayer stack spaceplate, while other embodiments may relate to the application of a similar process for determining the indices of refraction of different layers. Non-limiting examples of such processes will now be described.

A gradient descent process, in accordance with some embodiments, may begin with the creation of a swarm of spaceplates (e.g. 200 spaceplates), each having randomly generated layer thicknesses. The number of layers, the targeted compression factor, the range of incident angles of light, the break condition, and/or the range of allowed starting thicknesses may, in some embodiments, comprise different parameters in a simulation. The process may then apply a gradient descent approach to each generated spaceplate to determine a spaceplate configuration that has optimised or improved layer quantity (e.g. number of layers), index of refraction, and/or layer thicknesses.

Some embodiments may further relate to the use of a transfer matrix method (TMM) for calculating how light propagates through such substrates. For example, and without limitation, a TMM may be employed to determine phase output, transmission, intensity of light, or the like, through a spaceplate.

For a given spaceplate, and in accordance with one embodiment, such a process may begin by attempting to optimise a subset of the layers of a multilayer stack (e.g. the first three layers), for instance to improve computational efficiency. Upon satisfactorily adjusting the subset, layers may be added individually or in groups to repeat the optimisation process of the "new" spaceplate having the new layers included therewith. When the process determines that a peak has been reached, the process may add the new layer(s) to the previous subset until all layers have been optimised. If a multilayer stack has had all of its layers optimised, but a break condition has not been met, the process may discard that particular multilayer stack, replacing it in the swarm with a different multilayer stack configuration. If the break condition is indeed met during the process, the process may then pause and/or stop swarm optimisation, directing computational resources instead to optimisation of the promising device. In accordance with some embodiments, such subsequent optimisation of the promising device may comprise optimisation in accordance with progressively smaller learning rates, and/or refinement of optimisation parameters for increased resolution.

While the skilled artisan will appreciate that various break conditions may be applied to such a process in accordance with various embodiments, a non-limiting example of a break condition may include a target compression factor. In additional or alternative embodiments, and as further described below, break conditions may include, but are not limited to, a transmittance or a quality of fit to an expected (e.g. predicted) parameter value, or an error related thereto.

Upon identification of a peak in the simulation process with a satisfactory resolution (e.g. using the smallest designated learning rate), layer thicknesses may be refined and/or rounded to a preferred increment. For instance, and in accordance with one embodiment, layers of a multilayer stack may be rounded to increments of 2 nm to allow sufficient fabrication tolerance of a manufactured spaceplate, or to accommodate known fabrication processes and/or resolutions.

In accordance with some embodiments, a fitting process may be performed in which the expected output phase of an ideal spaceplate having a targeted compression factor is calculated and compared with the output phase of the simulated multilayer stack spaceplate being optimised (e.g. the "real" spaceplate). In one embodiment, the expected (i.e. ideal) output phase may be subtracted from the "real" output phase to determine an output phase offset. Such a characterisation may be used to, for instance, calculate a root mean square error (RMSE) between the ideal and real spaceplates for the target compression factor, which may in turn then be used to adjust or tune layer thicknesses to decrease a discrepancy or aberration from the ideal output. For instance, and in accordance with some embodiments, a RMSE may be used as a figure of metric in a minimisation process.

In accordance with other embodiments, a gradient descent or similar optimisation process may be employed to determine a spaceplate configuration with improved or optimised indices of refraction corresponding the various layers of a multilayer stack. For example, and in accordance with some embodiments, a process may begin with the generation of a swarm of spaceplate configurations having layers with randomly assigned indices of refraction. That is, while the previous description related to an optimisation process in which layers having defined indices of refraction were varied in thickness to improve a phase output of the resulting spaceplate, different embodiments relate to varying the index of refraction of individual layers. In some such embodiments, layers may have predefined or constant thicknesses, for instance to reduce demand on computational resources and/or to limit a parameter space in which to perform an optimisation process.

For example, and in accordance with some embodiments, an optimisation process (e.g. a gradient descent process) may begin with a swarm of multilayer stack spaceplates having a designated number of layers or range thereof (e.g. 5 to 5000 layers, 10 to 200 layers, 500 to 5000 layers, etc.), wherein each layer has a designated thickness (e.g. 5 nm). Should an optimisation process prefer to alter a layer thickness rather than an index of refraction, consecutive layers of the designated thickness may, for instance and in accordance with one embodiment, be assigned the same index of refraction to "artificially" increase the layer thickness. Otherwise, such embodiments may relate to the performance of a simulation similar to those embodiments described above with respect to establishing configurations of multilayer stack with varying layer thicknesses.

Such spaceplate generation processes may result in different spaceplate configurations having various properties, such as compression factors, total thicknesses, transmission properties, ability to accommodate different ranges of incident light (e.g. numerical apertures, or "NA"), or the like. Further, some embodiments may relate to spaceplates having various properties based on a designated parameter space, or, in accordance with some embodiments, based on acceptable trade-offs between various properties. For instance, increasing the NA and/or the compression factor may result in an increase in aberrations from an ideal spaceplate. Accordingly, a spaceplate configuration may be selected based on an acceptable range or tolerance in the NA or compression factor.

Figure 15:
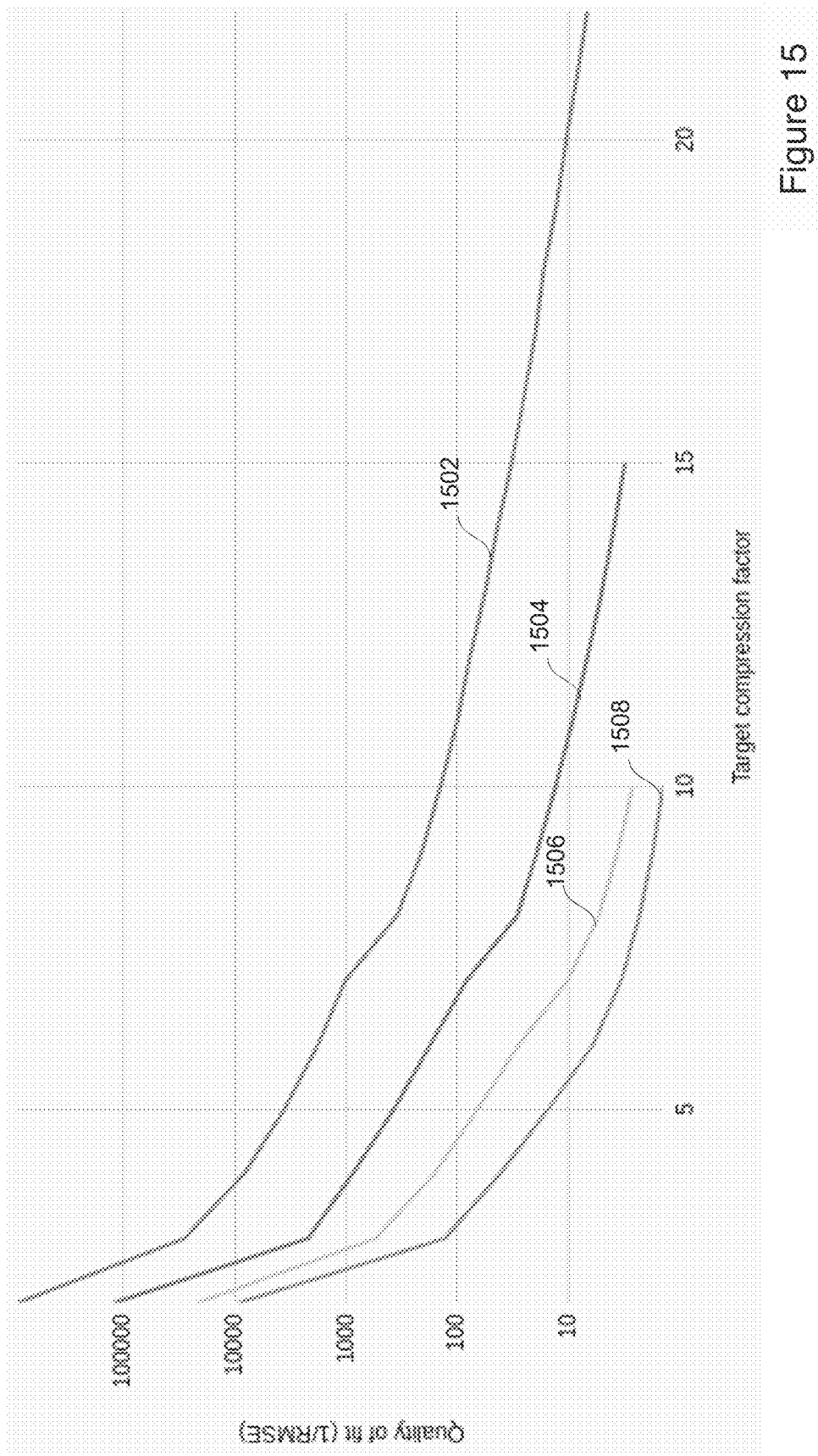
FIG. 15 is an exemplary plot of a quality of fits to idealised spaceplates as a function of a target compression factor, in accordance with some embodiments.

For instance, decreasing the NA may allow for an increase in the compression factor for a given number of layers in a spaceplate and for a constant figure of merit. For example, and in accordance with one embodiment, for a constant figure of merit of 1/RMSE=12.85, the compression factor of a spaceplate having 13 layers of variable thickness may be increased from 9.6 to 17.96 by allowing a decrease in NA from 0.26 (a common NA for optical applications) to 0.17. Characterisation of such a trade-off, in accordance with various embodiments, is shown in FIG. 15, where curves 1502, 1504, 1506, and 1508 of 1/RMSE versus the target compression factor, corresponding to spaceplates of different NA represented as ranges of angles of acceptance of incident light of up to 10 degrees, 15 degrees, 20 degrees, and 25 degrees, respectively, are shown.

Figure 16:
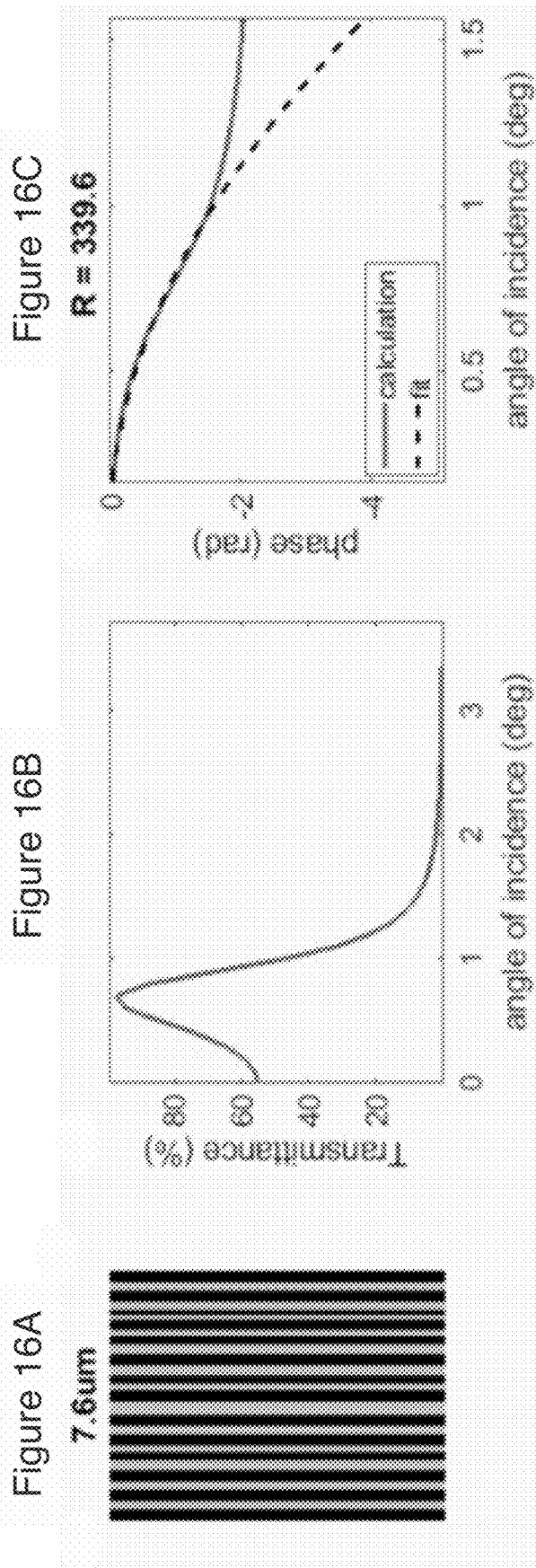
FIG. 16A is a schematic of an exemplary spaceplate with variable-width layers having a total width of 7.6 μm.
FIG. 16B is an exemplary plot of the transmittance of the spaceplate in FIG. 16A as a function of the angle of incidence of light.
FIG. 16C is an exemplary plot showing a fit of the phase output of the exemplary spaceplate of FIG. 16A to the output of an ideal spaceplate having a similar compression ratio, in accordance with some embodiments.

Accordingly, and in accordance with other embodiments, a spaceplate may comprise relatively high compression ratios if, for instance, it is permissible to have a low numerical aperture. For instance, and in accordance with another embodiment, FIGS. 16A to 16C show an example in which the trade-off between high compression and NA may be exploited to provide a spaceplate with a compression factor R=339.6, but a NA of 0.0175 (i.e. incident angular range of 0 degrees to 1 degree). In this embodiment, the exemplary spaceplate configuration comprises 27 layers of varying thickness for a total thickness of 7.6 µm (FIG. 16A), with a plot of transmittance as a function of angle of incidence shown in FIG. 16B. The output phase of the device between 0 degree and 1 degree is fit to the expected output phase of a device with the same target compression factor in FIG. 16C.

Figure 17:
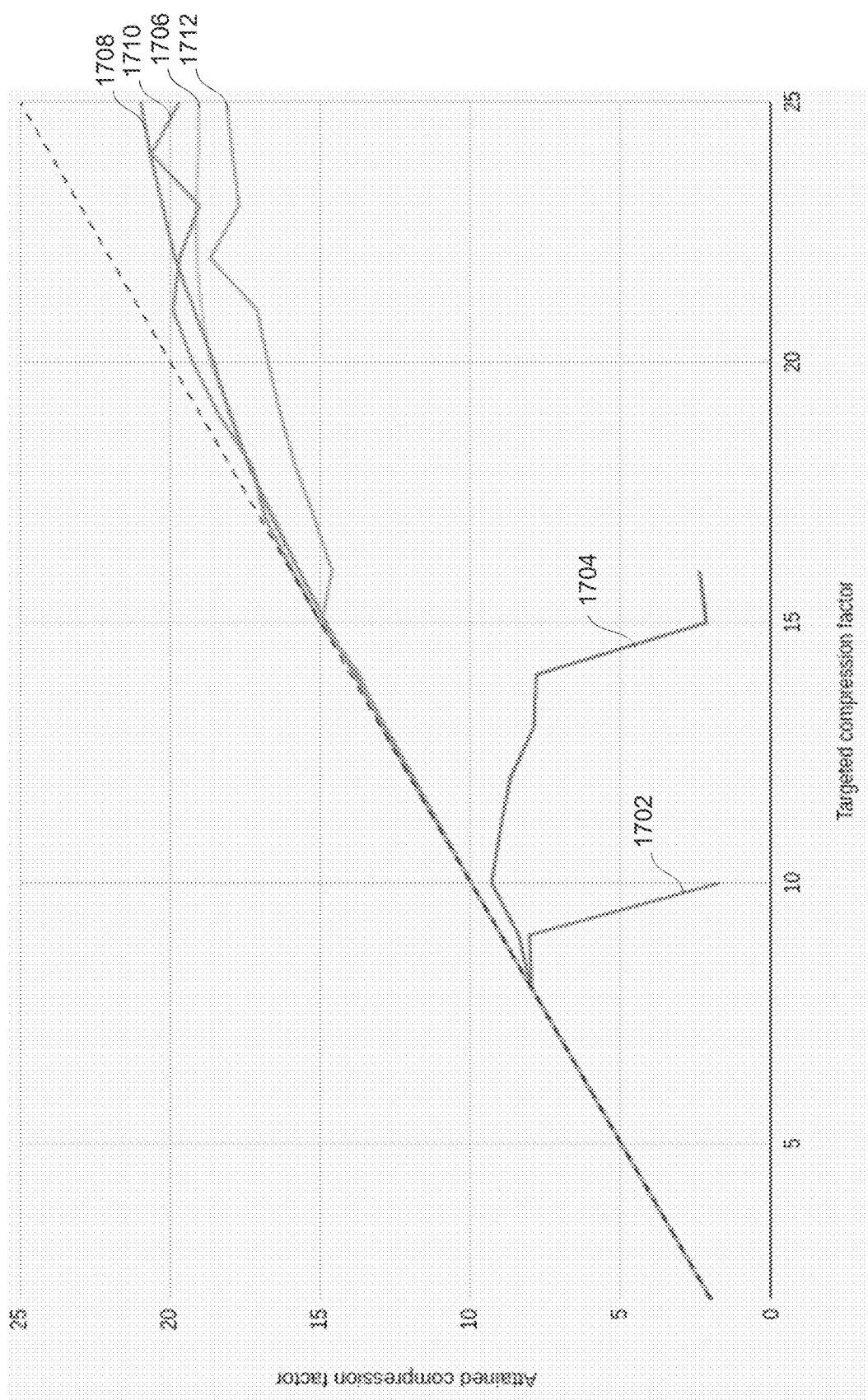
FIG. 17 is an exemplary plot of the attained compression ratio versus the targeted compression ratio for spaceplates having different numbers of layers, in accordance with some embodiments.

Similarly, and in accordance with other embodiments, a spaceplate configuration may be adopted with trade-offs with other parameters in mind. For instance, and in accordance with various other embodiments, a spaceplate configuration may be adopted to accommodate a trade-off in the attainable compression factor and the number of layers that may be assembled to form the spaceplate. For example, FIG. 17 shows curves of the attained compression factor versus the target compression factor for multilayer stack spaceplates having layers of variable thickness. In this example, multilayer stacks comprising 9, 11, 13, 17, 23, and 29 layers and a NA of 0.17 are shown by curves 1702, 1704, 1706, 1708, 1710, and 1712, respectively, while the dashed line corresponds to a slope of 1.

In accordance with various embodiments, increasing the number of layers may increase the degrees of freedom from which a spaceplate may be designed and/or optimised to improve, for instance, a compression factor. For example, the curves in FIG. 17 show that increasing the number of layers in a spaceplate between 9 and 17 layers increases the potential compression factor available to the spaceplate. However, in the example of FIG. 17, and in accordance with some embodiments, the 17-layer spaceplate represented by curve 1708 showed the highest attainable compression factor for the range examined in FIG. 17. Nevertheless, various embodiments herein contemplated may relate to various other spaceplate configurations in which the number of layers may be increased to increase a compression factor. For example, spaceplates designed using greater computational resources, and/or via selection of a parameter space that increases the ability of an optimisation process to designate layer thicknesses and/or indices of refraction with a higher number of layers (e.g. reducing the parameter space to be explored by a computational process), are also considered to be within the general scope and nature of the disclosure.

In accordance with one embodiment, a spaceplate may comprise a 13-layer spaceplate with a compression factor R=11.53, with a total thickness of 1.76 µm, resulting in 20.35 µm of propagation. Such an embodiment may relate to, for instance, a peak transmission of 99.11% (−0.0389 dB) at 11 degrees of incidence with a NA of 0.26. In yet other embodiments, a spaceplate may comprise (or be selected for, based on designated criteria) a designated number of layers (e.g. 5 to 25 layers), a compression factor (e.g. 2 to 25, 10 to 100, 10 to 10 000, etc.), a total thickness or range thereof (e.g. 5 nm, 500 nm, 500 nm to 500 µm, 5 to 50 nm, or the like), individual layer thickness (e.g. 2 nm to 20 nm, 5 nm to 500 nm, or the like), a numerical aperture or range thereof (e.g. 0.26, 0.2 to 0.3, 0.2 to 1, or the like), a transmittance (e.g. >10%, >20%, >30%, >90%, >98%, etc.), or the like.

While such examples may relate to spaceplates comprising layers of varying thicknesses, other embodiments relate to multilayer stacks comprising layers of various indices of refraction, as described above. For example, FIG. 18A shows a spaceplate configuration designed using an optimisation process allowing 5 nm-thick layers comprising indices of refraction ranging from 0 to infinity. In the example of FIG. 18A, the optimised indices of refraction are represented by the greyscale value of each layer, with the optimised index of refraction values ranging from 0.2 to 13.95 across the 101 layers of the spaceplate. This example further relates to a spaceplate having a NA of 0.26 and a peak transmission of 99.23% (−0.0336 dB), as shown in FIG.

18B. FIG. 18C shows a fit of the phase output of the spaceplate in FIG. 18A compared to an ideal spaceplate with a compression factor of 79.83.

While the example of FIGS. 18A to 18C comprises materials with indices of refraction between 0.2 and 14, other embodiments relate to spaceplates comprising materials with more readily available or more common indices of refraction. For example, and in accordance with another embodiment, FIGS. 19A to 19C show the spaceplate configuration of FIGS. 18A to 18C (i.e. 101 5 nm-thick layers, NA=0.26), but optimised while allowing only indices of refraction ranging from 1 to 4. In this example, FIG. 19A again shows the optimised indices of refraction as the greyscale value of each layer, while FIG. 19B shows a peak transmittance of 98.78% (−0.0533 dB) at 11 degrees. In this exemplary embodiment in which realistic values of the index of refraction were allowed during optimisation, the spaceplate has a compression factor of 6.38, as indicated by the fit with the output phase of an idealised spaceplate with this compression factor as a function of the angle of incidence shown in FIG. 19C. It was further noted that, in accordance with various embodiments, such spaceplates with variable but realistic values for the indices of refraction of the various constituent layers may comprise a relatively thin overall thickness, which may be a desirable property for many applications.

As experiments related to the design of spaceplates having layers with variable indices of refraction may relate to the simulation of spaceplates with a high number of layers (e.g. 500 to several thousand), the computational time associated with such optimisation regimes may relate to the study of a smaller number of spaceplates within a given optimisation process. For example, rather than optimising a swarm of 200 spaceplates, it may be more computationally efficient to study one or several such spaceplates at a time. Accordingly, and in accordance with some embodiments, various figures of metric may be employed to determine a desirable spaceplate configuration.

In the exemplary embodiments of FIGS. 18A to 19C, the transmission of the various devices was included as a figure of metric to determine the quality of the resultant spaceplate. As such, the transmission, in accordance with various embodiments, may be employed to improve the generation of spaceplate configurations. While it was observed that this figure of metric did not, in all cases, improve resultant spaceplate performance when layer thickness was a parameter to be optimised, it was noted that it did improve spaceplate performance when the layer index of refraction was parameterised.

Figure 20:
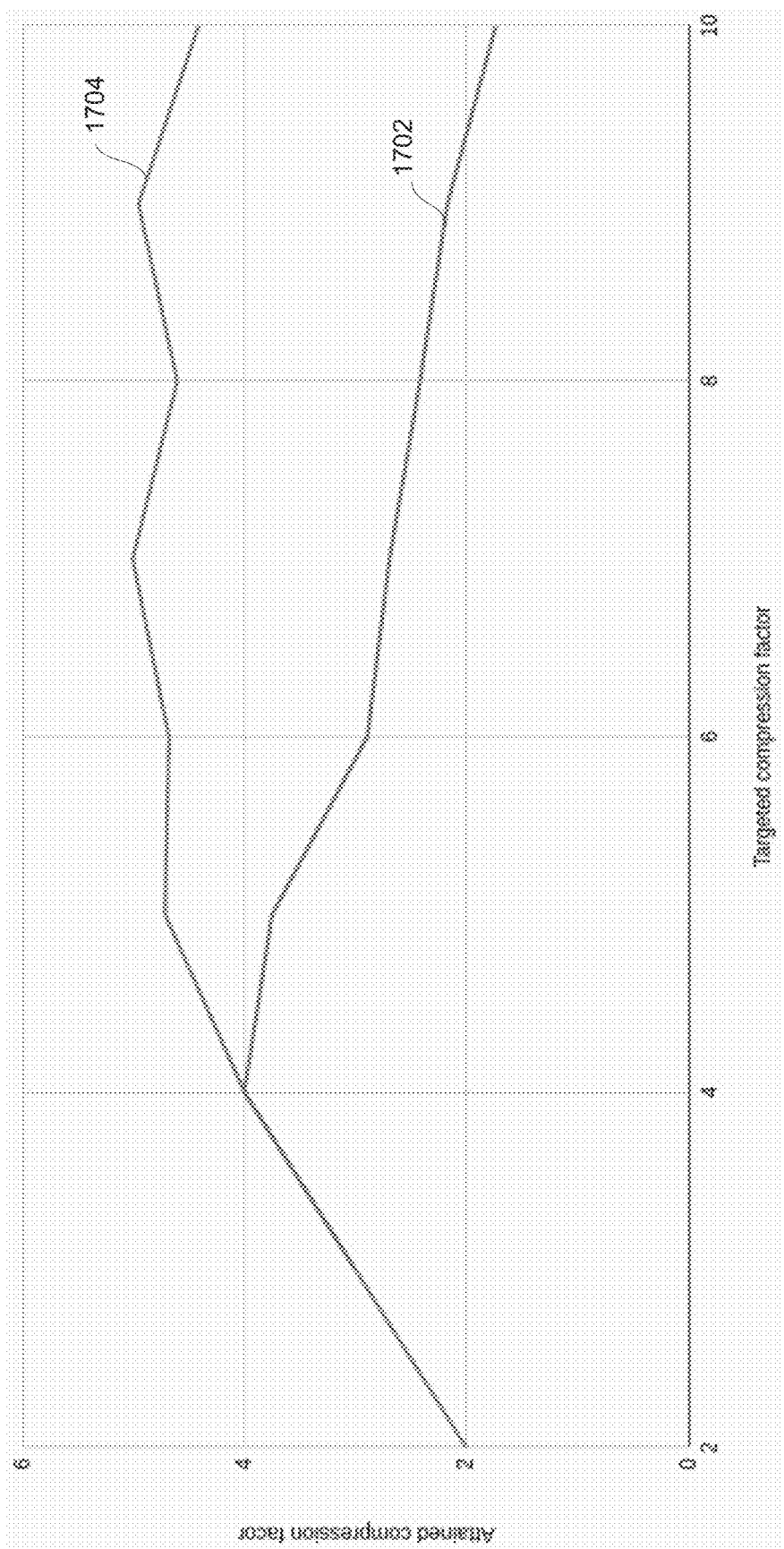
FIG. 20 is an exemplary plot of the attained compression ratio versus the targeted compression ratio of spaceplates generated using different figures of metric, in accordance with various embodiments.

For instance, and in accordance with some embodiments, FIG. 20 shows curves 1704 and 1702 of the attained compression factor versus the targeted compression when the figure of merit used in determining the quality of the generated spaceplate included, respectively, the compression factor R, and both the compression factor R and the transmission of the spaceplate, for 29-layer spaceplates having light incident between 0 degrees and 25 degrees.

In addition to the embodiments described above, various embodiments may further relate to spaceplates having an odd number of layers. For instance, devices having an odd number of layers were noted to tend to achieve a higher compression factor R than spaceplates having an even number of layers. Further, and in accordance with other embodiments, it was noted that devices having an odd number of layers of alternating Si and SiO$_2$ outperformed similarly layered devices that comprised an even number of layers. The skilled artisan, however, will appreciate that various embodiments relate to spaceplates comprising layers of different materials which may follow the opposite pattern of odd/even layer numbers, depending on the nature and properties of the constituent materials. Nevertheless, various embodiments herein contemplated indeed relate to spaceplates having an odd number of layers, which may necessitate a common "end" material (or different materials in the case of an even number of layers), which may confer, for instance, an improved compression ratio. For example, it was further noted that well performing spaceplates comprising an even number of layers tended to include a very thin "end" layer. This may indicate, in accordance with yet other embodiments, that an end layer thickness tending toward zero (i.e. very thin, approaching a spaceplate with an odd number of layers) may improve spaceplate properties. Such embodiments may be preferred if, for instance, a spaceplate fabrication process were to require an even number of layers.

Additionally, or alternatively, various embodiments relate to spaceplates comprising outer layers of a material (or two materials) with relatively higher indices of refraction than one or more "inner" materials. For instance, spaceplates comprising silicon (Si) and silica (SiO$_2$) may result in relatively higher compression ratios when the outer layers comprise silicon. Indeed, in even-numbered multilayer stacks, higher compression ratio spaceplates were observed when the outer silica layer tended towards a very small thickness (i.e. tended towards zero thickness).

In accordance with yet other embodiments, a spaceplate may be generated to yield higher performance (e.g. a higher compression ratio) for one or more polarisations of light. For example, a process in determining a spaceplate configuration may select or otherwise provide for a device with a high compression factor for p-polarised light. Alternatively, or additionally, a process may provide for a device with a high compression factor for s-polarised light. In yet other embodiments, a process may optimise for a spaceplate that is polarisation-independent. For example, and in accordance with some embodiments, a spaceplate having variable indices of refractions between layers may be well suited for both p- and s-polarised light (e.g. provide a high compression factor for s-polarised light and p-polarised light). Such embodiments may further relate to polarisation-independent spaceplates. In other embodiments, a spaceplate configuration generated by a process optimising layer thickness may provide for a spaceplate that yields a higher compression ratio, but one that may improve the compression factor for p-polarised light more than that of s-polarised light. The skilled artisan will, however, appreciate that various other relationships between optimisation processes and spaceplate performance (or metrics thereof) for various forms of light are herein contemplated. For example, and without limitation, optimisation processes (e.g. gradient descent or genetic algorithm processes, and/or other optimisation processes) may parameterise different properties and/or assume various other metrics of evaluation to determine suitable spaceplate configurations.

In accordance with yet other embodiments, a spaceplate may comprise an arbitrary thickness. For example, for a spaceplate with a given compression factor R, when increasing the thickness of any one layer, the compression factor may be approximately periodic. Accordingly, if the thickness of that layer is sufficiently increased, the compression factor may return approximately to the same value as "before" the layer thickness was increased. In accordance with some embodiments, such periodicity may arise as a function of the wavelength of light incident on the spaceplate, and may be tuned accordingly. In such or other embodiments, a spaceplate with an arbitrary thickness may provide the freedom to replace any amount of space (e.g. $d_{\it eff}$) by increasing the thickness of a single (or plurality of) layers in a spaceplate.

It will be appreciated that various aspects described for spaceplates related to, for instance, comprising layers of variable thickness, or those with variable indices of refraction, may apply to other forms of spaceplates. That is, spaceplates may be designed and/or employed based on various relationships herein described regardless of the manner in which they were designed. For instance, it will be understood that some embodiments relate to the employ of a spaceplate based on a trade-off between a compression factor R and the amount of aberration (e.g. RMSE). Similarly, a low degree of aberration may relate to spaceplates having a smaller NA, or range of incident angles of light which may be subject to the phase response characteristic of a spaceplate. A low degree of aberration may similarly be related to a higher number of layers, an odd number of layers, or the selection of outer layer materials of a spaceplate (e.g. layers with a higher index of refraction), which may lead to the choice of a spaceplate configuration for a particular application, regardless of whether the spaceplate comprises one, two, three, or more materials in turn comprising variable thicknesses and/or indices of refraction. In yet other embodiments, a NA may be sacrificed for a high compression ratio, or vice versa. Conversely, various embodiments relate to spaceplates comprising a NA of 0.26 or greater to, for instance, replace components or otherwise be compatible with conventional or other imaging systems. Alternatively, or additionally, a spaceplate with a high number of layers may be employed for an application in which a high compression factor is desirable. Conversely, if a compression factor may be sacrificed for, for instance, case of fabrication, a spaceplate may comprise a lower number of layers.

It will be further appreciated that while various embodiments described above may relate to multilayer stack spaceplates (i.e. metamaterial spaceplates) comprising alternating layers of Si and $SiO_2$, various other embodiments relate to spaceplates comprising other materials. For example, and without limitation, spaceplate layer materials may comprise various photonic materials, non-limiting examples of which may include dielectric materials or semiconductors (e.g. $TiO_2$, $Ta_2O_5$, TeOs, $Al_2O_3$, $SnO_2$, MgO, ZnO, $LiNbO_3$, or the like), nitrides (e.g. TiN, SiN, ZrN, GaN, or the like), chalcogenide glasses (e.g. $As_2S_3$, $As_2Se_3$, or the like), metals (e.g. Au, Ag, Al, Pt, or the like), degenerately doped semiconductors (e.g. tin-doped indium oxide (ITO), aluminum-doped zinc oxide (AZO), etc.) or other, for instance, doped materials, without departing from the general scope and nature of the disclosure. Further, it will be appreciated that embodiments related to spaceplates having layers of variable index of refraction inherently comprise different and/or a variety of materials. As available nanotechnology techniques allow for the fabrication of materials with nearly arbitrary index of refraction (e.g. through tuning doping levels, deposition techniques, plasma frequency tuning for doped semiconductors, or the like), it will be appreciated that various embodiments of a spaceplate are not limited to any specific one or combination of materials.

Multilayer spaceplates may further comprise more than two materials, which may be stacked in non-periodic or non-repeating arrangements. For example, a spaceplate comprising alternating layers of materials A, B, and C may be arranged in a repeating sequence of layers (e.g. A-B-C-A-B-C-A . . . ), or may be arranged in non-repeating sequences (e.g. A-B-C-B-A-C-A . . . ).

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. An optical imaging system for capturing an image of an object, the system comprising:
    an optical component disposable so to intersect and thus angularly distribute light from the object to form an image thereof at a physical image formation path distance from said optical component, wherein said angular distribution and said physical image formation path distance are designated, at least in part, by an optical property of image formation optics;
    a space-compression medium disposed within said physical image formation path distance so to intersect said angularly distributed light such that an incident angular distribution thereof is maintained at output while effectively increasing a transverse displacement of a beam of said angularly distributed light relative to a corresponding transverse translation of said beam through a region external to said space-compression medium of an equal size to that of said optical space-compression medium thereby effectively reducing said physical image formation path distance to ultimately form the image at a physical device image location advanced from said physical image formation path distance; and an image capture device disposed at said physical device image location.

2. The system of claim 1, wherein:

said optical component comprises an upstream optical component;

the system further comprises a complementary optical component disposable so to intersect light from the upstream optical component at a designated physical intervening distance therefrom so to form the image at said physical image formation path distance, wherein said designated physical intervening distance is designated, at least in part, by said optical property of said upstream optical component;

said space-compression medium is disposed within said designated physical intervening distance so to intersect said angularly distributed light such that said incident angular distribution thereof is maintained at output while effectively increasing said transverse displacement thereof within said optical space-compression medium thereby effectively reducing said designated physical intervening distance to a physically advanced intervening distance lesser than said designated physical intervening distance; and said complementary optical component is disposed at said physically advanced intervening distance downstream said space-compression medium to form the image at said physical device image location.

3. An optical system for reducing a physical propagation distance over which light propagates through a background medium, comprising:

an optical space-compression medium disposed so to intersect a light field incident thereon having an incident angular distribution relative to light field propagation direction, said optical space-compression medium comprising an angle-dependent phase response that propagates a phase of said light field while travelling therethrough by an amount that is greater than a corresponding propagation of said phase in a region of the background medium of equal size to that of said optical space-compression medium, while substantially maintaining said incident angular distribution upon said light field exiting said optical space-compression medium;

wherein said optical space-compression medium effectively increases a transverse displacement of a beam of said light field relative to a corresponding transverse translation of said beam through a region of the background medium of an equal size to that of said optical space-compression medium, thereby reducing the physical propagation distance of said light field along said light field propagation direction.

4. The optical system of claim 3, further comprising a light-shaping element disposed upstream of said optical space-compression medium so to produce said incident angular distribution.

5. The optical system of claim 3, wherein said phase response is at governed by an angle-dependent refractive index defined by:

$$\frac{n(\theta_{SP})}{n_{BG}} = \frac{C + \sqrt{C^2 + (\mathcal{R}^2 - C^2)(1 + (\mathcal{R}^2\tan^2\theta_{SP})}}{(1 + \mathcal{R}^2\tan^2\theta_{SP})\cos\theta_{SP}}$$

where $C=(\phi_G+2\pi m(\theta_{SP}))/\phi_{BG}(0,d)$.

6. The optical system of claim 3, wherein said phase response produces an output phase $\Phi$ of light exiting said space-compression medium at least partially in accordance with $\Phi=2\pi N_{BG} d_{eff} \cos\theta/\lambda$.

7. The optical system of claim 3, wherein said substantially maintaining said incident angular distribution comprises substantially maintaining said incident angular distribution while including an arbitrary offset angle therewith upon said light field exiting said optical space-compression medium.

8. The optical system of claim 3, wherein said substantially maintaining said incident angular distribution comprises maintaining said incident angular distribution within a designated error tolerance upon said light field exiting said optical space-compression medium.

* * * * *